(12) United States Patent
Jang

(10) Patent No.: US 11,973,211 B2
(45) Date of Patent: Apr. 30, 2024

(54) PROCESS FOR PRODUCING METAL NANOWIRES AND NANOWIRE-GRAPHENE HYBRID PARTICULATES

(71) Applicant: Nanotek Instruments, Inc., Dayton, OH (US)

(72) Inventor: Bor Z. Jang, Centerville, OH (US)

(73) Assignee: Honeycomb Battery Company, Dayton, OH (US)

( * ) Notice: Subject to any disclaimer, the term of this patent is extended or adjusted under 35 U.S.C. 154(b) by 650 days.

(21) Appl. No.: 16/258,854

(22) Filed: Jan. 28, 2019

(65) Prior Publication Data

US 2020/0243844 A1    Jul. 30, 2020

(51) Int. Cl.
| | |
|---|---|
| *B32B 9/00* | (2006.01) |
| *C01B 32/184* | (2017.01) |
| *C01B 32/225* | (2017.01) |
| *H01M 4/04* | (2006.01) |
| *H01M 4/133* | (2010.01) |
| *H01M 4/134* | (2010.01) |

(Continued)

(52) U.S. Cl.
CPC ......... *H01M 4/1393* (2013.01); *C01B 32/184* (2017.08); *C01B 32/225* (2017.08); *H01M 4/0471* (2013.01); *H01M 4/133* (2013.01); *H01M 4/134* (2013.01); *H01M 4/1395* (2013.01); *H01M 4/364* (2013.01); *H01M 4/583* (2013.01); *H01M 10/0525* (2013.01); *B82Y 30/00* (2013.01); *B82Y 40/00* (2013.01); *C01B 2204/04* (2013.01); *H01M 2004/021* (2013.01); *Y10T 428/30* (2015.01)

(58) Field of Classification Search
CPC ......... B32B 9/007; B82Y 30/00; B82Y 40/00; Y10T 428/30
USPC ...................................................... 428/408
See application file for complete search history.

(56) References Cited

U.S. PATENT DOCUMENTS

| 7,071,258 B1 | 7/2006 | Jang et al. |
| 2005/0271574 A1 | 12/2005 | Jang et al. |

(Continued)

FOREIGN PATENT DOCUMENTS

| CN | 107217330 A | 9/2017 |
| KR | 101138865 B1 | 5/2012 |

(Continued)

OTHER PUBLICATIONS

PCT/US20/15358 International Search Report and Written Opinion dated May 25, 2020, 11 pages.

*Primary Examiner* — Daniel H Miller

(57) ABSTRACT

Disclosed is a process for producing graphene-metal nanowire hybrid material, comprising: (A) preparing a catalyst metal-coated mixture mass, which includes mixing graphene sheets with source metal particles to form a mixture and depositing a nanoscaled catalytic metal onto surfaces of the graphene sheets and/or metal particles; and (B) exposing the catalyst metal-coated mixture mass to a high temperature environment (preferably from 100° C. to 2,500° C.) for a period of time sufficient to enable a catalytic metal-catalyzed growth of multiple metal nanowires using the source metal particles as a feed material to form the graphene-metal nanowire hybrid material composition. An optional etching or separating procedure may be conducted to remove catalytic metal or graphene from the metal nanowires.

26 Claims, 11 Drawing Sheets

(51) Int. Cl.
*H01M 4/1393* (2010.01)
*H01M 4/1395* (2010.01)
*H01M 4/36* (2006.01)
*H01M 4/583* (2010.01)
*H01M 10/0525* (2010.01)
*B82Y 30/00* (2011.01)
*B82Y 40/00* (2011.01)
*H01M 4/02* (2006.01)

(56) References Cited

U.S. PATENT DOCUMENTS

| | | | |
|---|---|---|---|
| 2008/0048152 A1 | 2/2008 | Jang et al. | |
| 2008/0213189 A1* | 9/2008 | Lee | A61K 49/0423 435/325 |
| 2016/0285084 A1 | 9/2016 | Fang et al. | |
| 2016/0294000 A1* | 10/2016 | He | H01M 10/054 |
| 2018/0195205 A1* | 7/2018 | Urban | C30B 29/10 |

FOREIGN PATENT DOCUMENTS

| | | |
|---|---|---|
| KR | 1020160111754 A | 9/2016 |
| WO | 2018067391 A1 | 4/2018 |

* cited by examiner 200 nm 100 nm

_____ 200 nm

PROCESS FOR PRODUCING METAL NANOWIRES AND NANOWIRE-GRAPHENE HYBRID PARTICULATES

FIELD OF THE INVENTION

This invention relates to a process for producing metal nanowires for lithium-ion battery anode and electronic device applications.

BACKGROUND

Nanowires are finding increasing application in electronic, opto-electronic and nanoelectromechanical devices. Nanowires may also be used as additives in advanced composites, for metallic interconnects in nanoscale quantum devices, as field-emitters and as leads for biomolecular nanosensors. Nanowires of Zn, Cd, Al, Sn, Si, Ge, and Pb are also good anode active materials for the lithium-ion battery due to their high lithium storage capacity.

Lithium ion battery is a prime candidate energy storage device for electric vehicle (EV), renewable energy storage, and smart grid applications. Graphite materials have been widely used as an anode active material for commercial lithium ion batteries due to their relatively low cost and excellent reversibility. However, the theoretical lithium storage capacity of graphite is only 372 mAh/g (based on $LiC_6$), which can limit the total capacity and energy density of a battery cell. The emerging EV and renewable energy industries demand the availability of rechargeable batteries with a significantly higher energy density and power density than what the current Li ion battery technology can provide. Hence, this requirement has triggered considerable research efforts on the development of electrode materials with higher specific capacity, excellent rate capability, and good cycle stability for lithium ion batteries.

Several elements from Group III, IV, and V in the periodic table can form alloys with Li at certain desired voltages. Therefore, various anode materials based on such elements (e.g. Si, Ge, Sn, Sb, Cd, Zn, etc.), their compounds, and some metal oxides (e.g., $SnO_2$) have been proposed for lithium ion batteries. Among these, silicon is considered the most promising one since it has the highest theoretical specific capacity (up to 4,200 mAh/g in the stoichiometric form of $Li_{4.4}Si$) and low discharge potential (i.e., high operation potential when paired with a cathode).

However, using Si as an example, the dramatic volume changes (up to 380%) of Si during lithium ion alloying and de-alloying (cell charge and discharge) often led to severe and rapid battery performance deterioration. The performance fade is mainly due to the volume change-induced pulverization of Si and the inability of the binder/conductive additive to maintain the electrical contact between the pulverized Si particles and the current collector. In addition, the intrinsically low electric conductivity of silicon and other metal materials is another challenge that needs to be addressed. Thus far, many attempts have been made to improve the electrochemical performance of Si-based anode materials, which include (1) reducing particle size to the nanoscale (<100 nm), such as Si nanoparticles, nanowires, or thin film, to reduce the total strain energy, which is a driving force for crack formation in the particle; (2) depositing Si particles on a highly electron-conducting substrate; (3) dispersing Si particles in an active or non-active matrix; and (4) coating Si particles with a layer of carbon. Although some promising anodes with specific capacities in excess of 1,000 mAh/g (at a low charge/discharge rate; e.g. 0.1 C) have been reported, it remains challenging to retain such high capacities over cycling (e.g., for more than 100 cycles) without significant capacity fading. Furthermore, at a higher C rate, Si particles and other high-capacity anode active material (Ge, Sn, Cd, Zn, etc.) are typically incapable of maintaining a high lithium storage capacity. It may be noted that a rate of n C means completing the charge or discharge cycle in 1/n hours: 0.1 C=10 hours, 0.5 C=2 hours, 3 C=⅓ hours or 20 minutes.

Although nanoscaled anode active materials, such as nanowires of Ge, Sn, and Zn, are promising high-capacity anode materials for high charge/discharge rate applications, these materials remain too expensive to be economically viable.

For other applications, metal nanowires are not without issues. For instance, metal nanowires may be used as a conductive material for forming a transparent conductive film for display device applications. The metal nanowire may be a wire-shaped nanostructure having a thickness or diameter in the range from about 10 nm to about 100 nm, and a length from about 3 μm to about 100 μm. However, it has been challenging to control shapes of the metal nanowires. In many cases, nanoparticles, nanobars, or nanoclusters are inevitably formed during the process of forming the metal nanowires. The nanoparticles may be globe-shaped, plate-shaped or polyhedron-shaped. The nanobar may have a small aspect ratio (long axis-to-short axis ratio). The nanoclusters may be formed by aggregation of metal nanowires. These side effects lead to a reduced yield of metal nanowire production.

In other cases, metal nanowires may be surrounded by an organic protection agent that is added in order to guide the directional growth of the metal nanowires. Consequently, the contact resistance between the metal nanowires may be increased due to the presence of organic protection agent when multiple metal nanowires are combined to form a network of electron-conducting pathways. As a result, it may be difficult to maintain the high electric conductivity of the nanowire network.

Herein, we present a facile and cost-effective method of mass-producing metal nanowires. This method avoids all the problems commonly associated with conventional methods of producing nanoscaled metal wires.

SUMMARY OF THE INVENTION

The present invention provides a process for producing a graphene/metal nanowire hybrid material composition; the process comprising: (A) preparing a catalyst metal-coated mixture mass, which includes mixing exfoliated graphite flakes, having a flake thickness from 100 nm to 1 μm, or graphene sheets, having a thickness from 0.34 nm to 100 nm, with micron or sub-micron scaled source metal particles, having a particle diameter from 50 nm to 50 μm, to form a mixture and depositing a catalytic metal, in the form of nanoparticles having a size from 1 nm to 100 nm or a coating having a thickness from 1 nm to 100 nm, onto surfaces of the exfoliated graphite flakes or graphene sheets and/or surfaces of the source metal particles, wherein the source metal material is selected from a transition metal, Al, Be, Mg, Ca, an alloy thereof, a compound thereof, or a combination thereof; and (B) exposing the catalyst metal-coated mixture mass to a high temperature environment, from 100° C. to 2,500° C., for a period of time sufficient to enable a catalytic metal-assisted growth of multiple metal nanowires, having a diameter or thickness from 2 nm to 100 nm, from the source metal particles to form the graphene-metal nanowire hybrid material composition.

In certain embodiments, the catalytic metal (including metalloid) is selected from Cu, Ni, Co, Mn, Fe, Ti, Al, Ag, Au, Pt, Pd, Pb, Bi, Sb, Zn, Cd, Ga, In, Zr, Te, P, Sn, Ge, Si, As, Te, Se, or a combination thereof, wherein the catalytic metal is different than the source metal material. Preferably, a catalytic metal and its pairing source metal material form a eutectic point in their phase diagram.

The transition metal as a source metal contains an element preferably selected from Cu, Ni, Co, Mn, Fe, Ti, Ag, Au, Pt, Pd, Zn, Cd, Mo, Nb, Zr, an alloy thereof, or a combination thereof. The alloy of a transition metal of interest may contain one or more different elements that constitute no greater than 30% by weight of the alloy. For instance, a Cu alloy in this context can contain up to 30% by weight of Zn or both Zn and Sn combined.

The graphene material (graphene sheets) may be selected from pristine graphene, graphene oxide, reduced graphene oxide, graphene fluoride, graphene bromide, graphene iodide, boron-doped graphene, nitrogen-doped graphene, chemically functionalized graphene, or a combination thereof. Preferably, the graphene material is selected from a single-layer sheet or few-layer platelet of pristine graphene, graphene oxide, reduced graphene oxide, graphene fluoride, graphene bromide, graphene iodide, boron-doped graphene, nitrogen-doped graphene, chemically functionalized graphene, or a combination thereof, wherein few layer is defined as less than 10 layers of graphene planes.

The starting micron or sub-micron scaled source metal particles can have a diameter from 0.2 μm to 50 μm, but preferably from 0.5 μm to 5 μm, and more preferably <3 μm.

The starting source metal particles and starting graphene material (in a thin sheet form), referred to as primary particles, are mixed to produce secondary particles, which are each a mixture of graphene sheets, source metal particles, and possibly other ingredients (e.g. conductive additive). In an embodiment, the graphene sheets and micron or sub-micron scaled source metal particles are mixed to form a mixture in a particulate form (multiple secondary particles having a size from 1 μm to 30 μm).

In one embodiment, the starting graphene sheets and micron or sub-micron scaled source metal particles are mixed to form a mixture prior to the step of depositing a catalytic metal on surfaces of graphene sheets and/or surfaces of source metal particles. This mixture is preferably prepared in a particulate form, characterized by having the two primary particles (graphene sheets or exfoliated graphite flakes and source metal particles) combined to form secondary particles having a diameter from 1 to 100 μm, preferably from 2 to 50 μm, and more preferably from 5 to 20 μm. The graphene/metal mixture can optionally contain an amount (e.g. 1% to 30% by weight) of a conductive additive for the mere purpose of enhancing the electrical or thermal conductivity of the resulting battery electrode. The conductive additive may be selected from natural graphite, artificial graphite, mesophase carbon, mesophase pitch, mesocarbon microbead, soft carbon, hard carbon, coke, carbon fiber, carbon nanofiber, carbon nanotube, carbon black, or a combination thereof. This conductive additive is preferably not coated with a catalytic metal and is not involved in promoting the growth of metal nanowires.

In certain embodiments, at least one of the secondary particles (also referred to as particulates) comprises multiple metal nanowires that are embraced or encapsulated by a shell of graphene sheets or exfoliated graphite flakes.

The step of mixing the source metal particles and graphene sheets is conducted by liquid solution mixing, homogenizer mixing, high shearing mixing, wet milling, air milling, or ball-milling.

In an alternative embodiment, the mixing of graphene sheets (or exfoliated graphite flakes) with micron or sub-micron scaled source metal particles is conducted after surfaces of the graphene sheets and/or the source metal particles are deposited with the catalytic metal. The mixing of graphene sheets with micron or sub-micron scaled source metal particles is conducted in such a manner that the resulting mixture is in a form of porous secondary particles having a diameter from 1 μm to 20 μm and having pores therein from 2 nm to 1 μm in size.

In certain embodiments, in the invented process, the step of depositing a catalytic metal includes (a) dissolving or dispersing a catalytic metal precursor in a liquid to form a precursor solution, (b) bringing the precursor solution in contact with surfaces of the graphene sheets, exfoliated graphite flakes, and/or source metal particles, (c) removing the liquid component; and (d) chemically or thermally converting the catalytic metal precursor to the catalytic metal coating or metal nanoparticles. In one embodiment, the step (d) of chemically or thermally converting the catalytic metal precursor is conducted concurrently with the procedure (B) of exposing the catalyst metal-coated mixture mass to a high temperature environment.

In the process, the step (d) of chemically or thermally converting the catalytic metal precursor may be conducted concurrently with the procedure (C) of exposing the catalyst metal-coated mixture mass to a high temperature environment.

In certain embodiments, the catalytic metal precursor is a salt or organo-metal molecule of a metal (including a metalloid) selected from Cu, Ni, Co, Mn, Fe, Ti, Al, Ag, Au, Pt, Pd, Pb, Bi, Sb, Zn, Cd, Ga, In, Zr, Te, P, Sn, Ge, Si, As, Te, Se, or a combination thereof.

In some preferred embodiments, the catalytic metal precursor is selected from a nitrate, acetate, sulfate, phosphate, hydroxide, or carboxylate of a metal selected from Cu, Ni, Co, Mn, Fe, Ti, Al, Ag, Au, Pt, Pd, Pb, Bi, Sb, Zn, Cd, Ga, In, Zr, Te, P, Sn, Ge, Si, As, Te, Se, or a combination thereof.

In some embodiments, the catalytic metal precursor is selected from a nitrate, acetate, sulfate, phosphate, hydroxide, or carboxylate of a transition metal.

The step (C) of exposing the catalyst metal-coated source metal material to a high temperature environment is preferably conducted in steps, including at least at a lower temperature (first temperature) for a first period of time and then at a higher temperature (second temperature) for a second period of time. These temperatures can include a first temperature from 100° C. to 1,000° C. and a second temperature from 300° C. to 2,500° C. The heat treatment at the first temperature is mainly aimed at reducing the metal precursor (e.g. a metal salt) to a metal phase or to activate the catalytic metal coated on the source metal material particle surfaces. The heat treatment at the second temperature is aimed at building a thermodynamic environment conducive to initiation and growth of metal nanowires from the source metal particles. It may be noted that the required high temperature range depends on the catalytic metal used, given the same source metal material.

In certain embodiments, the source metal material and the pairing catalytic metal form a eutectic point in the phase diagram and the procedure of exposing the catalyst metal-coated metal material to a high temperature environment includes exposing the material to an initial temperature ($T_i$)

equal to or higher than the eutectic point (Te) for a desired period of time and then bringing the material to a temperature (Tc) below the initial temperature Ti; Tc may be above or below the eutectic point Te. In some embodiments, the exposure temperature (Ti and/or Tc) is higher than the eutectic temperature by 0.5 to 500 degrees on the Celsius scale (preferably by 1-100 degrees centigrade).

These metal nanowires appear to have extruded out from the starting source metal particles and emanate from a center of the source metal particle. The metal nanowires produced in this manner typically have a diameter less than 100 nm and a length-to-diameter aspect ratio of at least 5 (more typically l/d=10-10,000 and most typically 100-1,000).

In an embodiment, the step of depositing a catalytic metal on surfaces of the metal particles and graphene sheets or expanded graphite flakes includes (a) dissolving or dispersing a catalytic metal precursor in a liquid to form a precursor solution, (b) bringing said precursor solution in contact with surfaces of source metal particles and graphene sheets or expanded graphite flakes, (c) removing the liquid; and (d) chemically or thermally converting the catalytic metal precursor to the catalytic metal coating or nanoparticles. The step (d) of chemically or thermally converting the catalytic metal precursor is conducted concurrently with the procedure (C) of exposing the catalyst metal-coated materials to a high temperature environment.

Preferably, the catalytic metal precursor is a salt or organo-metal molecule of catalytic metal precursor is a salt or organo-metal molecule of a metal selected from Cu, Ni, Co, Mn, Fe, Ti, Al, Ag, Au, Pt, Pd, Pb, Bi, Sb, Zn, Cd, Ga, In, Zr, Te, P, Sn, Ge, Si, As, Te, Se, or a combination thereof. Examples of the precursors include copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper hydroxide, nickel hydroxide, cobalt hydroxide, manganese hydroxide, iron hydroxide, titanium hydroxide, aluminum hydroxide, copper carboxylate, nickel carboxylate, cobalt carboxylate, manganese carboxylate, iron carboxylate, titanium carboxylate, aluminum carboxylate, or a combination thereof.

The catalytic metal is preferably selected from Cu, Ni, Co, Mn, Fe, Ti, Al, Ag, Au, Pt, Pd, Pb, Bi, Sb, Zn, Cd, Ga, In, Zr, Te, P, Sn, Ge, Si, As, Te, Se, or a combination thereof. They can be produced from the aforementioned precursors. Alternatively, the deposition of a catalytic metal on the source metal surfaces can be accomplished more directly. Thus, in certain embodiments, the step of depositing a catalytic metal is conducted by a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, ball milling, or a combination thereof.

The procedure of exposing the catalyst metal-coated source metal materials to a high temperature environment may be conducted in a protective atmosphere of an inert gas, nitrogen gas, hydrogen gas, a mixture thereof, or in a vacuum.

The presently invented process may further comprise a procedure of removing the catalytic metal from the graphene/metal nanowires hybrid after the nanowires are produced; for instance, via chemical etching or electrochemical etching.

The process may further comprise a procedure of mixing metal nanowires with a carbonaceous or graphitic material (as a conductive additive) and an optional binder material to form an electrode layer, wherein the carbonaceous or graphitic material is selected from a chemical vapor deposition carbon, physical vapor deposition carbon, amorphous carbon, chemical vapor infiltration carbon, polymeric carbon or carbonized resin, pitch-derived carbon, natural graphite, artificial graphite, mesophase carbon, mesophase pitch, mesocarbon microbead, soft carbon, hard carbon, coke, carbon fiber, carbon nanofiber, carbon nanotube, carbon black, or a combination thereof.

The present invention also provides a process for producing a graphene/metal nanowire hybrid material composition wherein the metal nanowires have a diameter or thickness from 2 nm to 100 nm, the process comprising: (a) preparing a precursor mixture of source metal particles (having a size from 50 nm to 100 μm) and graphene sheets or expanded graphite flakes, wherein the source metal is selected from a transition metal, Al, Be, Mg, Ca, an alloy thereof, a compound thereof, or a combination thereof; (b) depositing a catalyst metal precursor onto surfaces of the metal particles and graphene sheets or expanded graphite flakes to form a catalyst metal precursor-coated material mixture; and (c) exposing the catalyst metal precursor-coated material mixture to a high temperature environment, from 100° C. to 2,500° C., for a period of time sufficient to convert the catalyst metal precursor to a metal catalyst in the form of nanoparticles having a size from 1 nm to 100 nm or a coating having a thickness from 1 nm to 100 nm in physical contact with the metal particles and graphene sheets or expanded graphite flakes, and enable a catalyst metal-assisted growth of multiple metal nanowires from the metal particles. It is essential that the catalyst metal nanoparticles coating are in physical contact with the metal particles and graphene sheets or expanded graphite flakes, preferably deposited on surfaces of the metal particles and graphene sheets or expanded graphite flakes.

In certain embodiments, the source metal material and the pairing catalytic metal form a eutectic point in the phase diagram and the procedure of exposing the catalyst metal precursor-coated metal material to a high temperature environment includes exposing the material to an initial temperature (Ti) equal to or higher than the eutectic point (Te) for a desired period of time and then bringing the material to a temperature (Tc) below the initial temperature Ti; Tc may be above or below the eutectic point Te. In some embodiments, the exposure temperature (Ti and/or Tc) is higher than the eutectic temperature by 0.5 to 500 degrees on the Celsius scale (preferably by 1-100 degrees centigrade). This initial temperature (Ti) must be higher than the required temperature for converting the catalytic metal precursor to the metal phase.

The present invention also provides a battery electrode containing metal nanowires (with or without the graphene sheets or expanded graphite flakes) that are produced by the inventive process. Also provided is a lithium battery containing metal nanowires produced by the inventive process as an anode active material.

DETAILED DESCRIPTION OF PREFERRED EMBODIMENTS

The present invention provides a process for producing a graphene/metal nanowire hybrid material composition; the process comprising: (A) preparing a catalyst metal-coated mixture mass, which includes mixing exfoliated graphite flakes, having a flake thickness from 100 nm to 1 μm, or graphene sheets, having a thickness from 0.34 nm to 100 nm, with micron or sub-micron scaled source metal particles, having a particle diameter from 50 nm to 50 μm, to form a mixture and depositing a catalytic metal, in the form of nanoparticles having a size from 1 nm to 100 nm or a coating having a thickness from 1 nm to 100 nm, onto surfaces of the exfoliated graphite flakes or graphene sheets and/or surfaces of the source metal particles, wherein the source metal material is selected from a transition metal, Al, Be, Mg, Ca, an alloy thereof, a compound thereof, or a combination thereof; and (B) exposing the catalyst metal-coated mixture mass to a high temperature environment, from 100° C. to 2,500° C., for a period of time sufficient to enable a catalytic metal-assisted growth of multiple metal nanowires, having a diameter or thickness from 2 nm to 100 nm, from the source metal particles to form the graphene-metal nanowire hybrid material composition.

The present invention provides a process for initiating and growing metal nanowires from micron or sub-micron scaled source metal particles having an original particle diameter (prior to nanowire growth) from 50 nm to 100 μm (preferably from 100 nm to 20 μm). In other words, the starting source metal material is micron or sub-micron scaled metal particles, which are thermally and catalytically converted directly into nanoscaled, wire-shaped structures having a diameter or thickness from 2 nm to 100 nm. Graphene sheets and/or expanded graphite flakes play a key role in promoting the growth of a larger number of smaller-diameter metal nanowires (more typically from 2 to 35 nm) relative to the growth of metal nanowires (typically having a diameter from 20 nm to 100 nm and more typically from 35 to 90 nm) from source metal particles alone without the presence of graphene sheets and/or expanded graphite flakes.

Figure 4A:
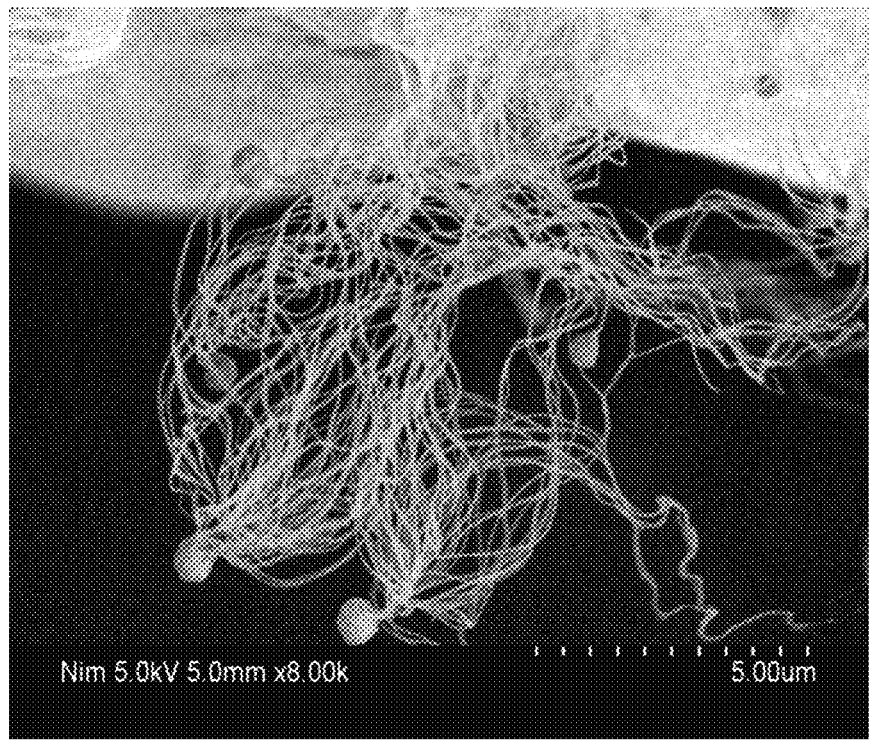
FIG. 4(A) SEM image of Si nanowires grown from Si particles without the presence of graphene sheets or graphite flakes.
Figure 4B:
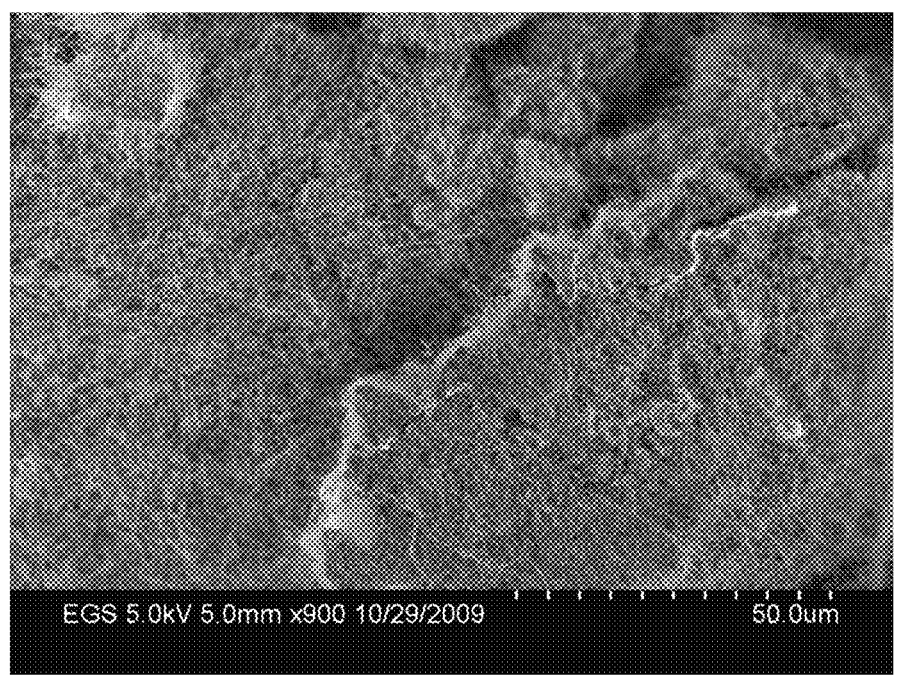
FIG. 4(B) SEM image of Si nanowires grown from Si particles with the presence of graphene sheets.
Figure 5A:
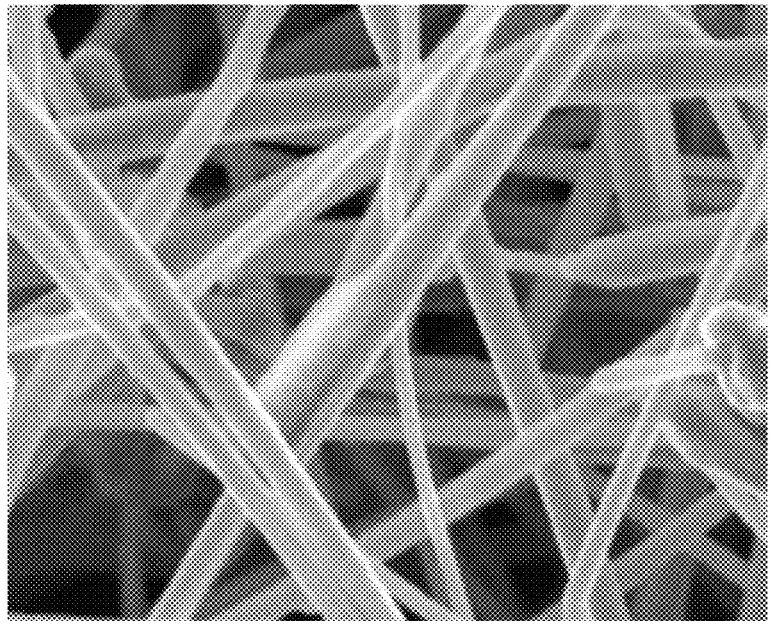
FIG. 5(A) SEM image of Cu nanowires.
Figure 5B:
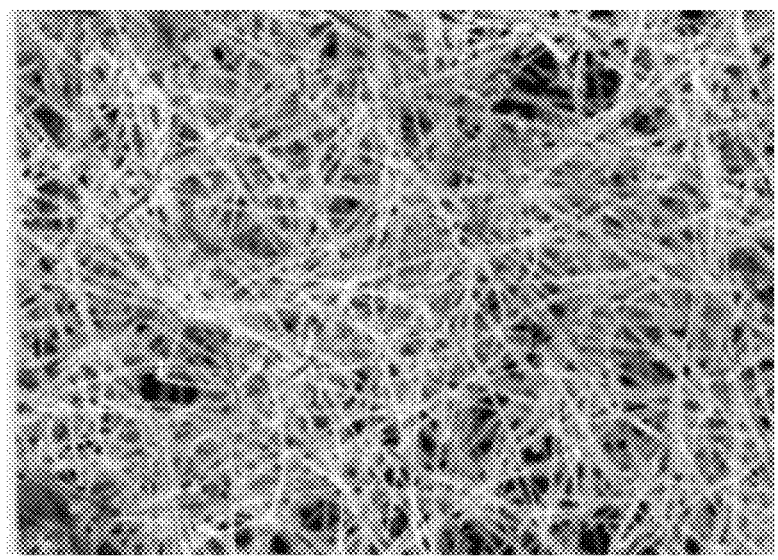
FIG. 5(B) SEM image of Cu nanowires, grown in the presence of graphene sheets.
Figure 6A:
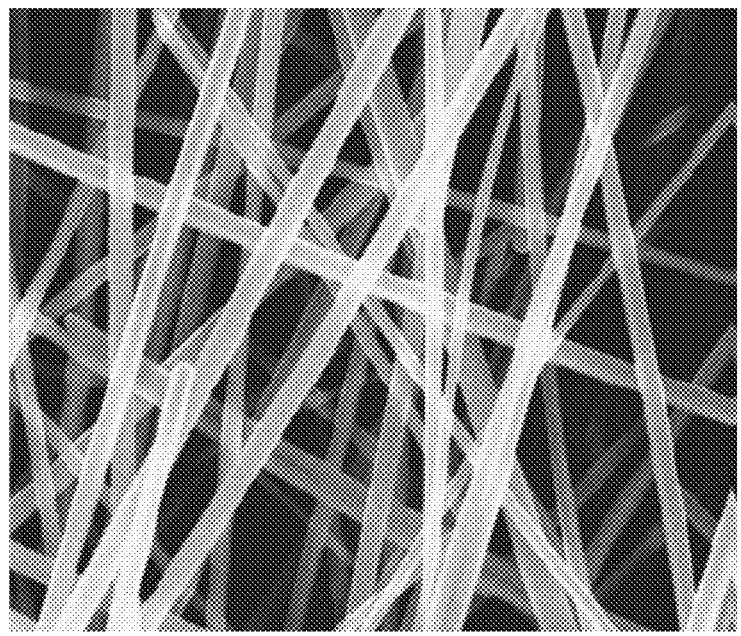
FIG. 6(A) SEM image of Ag nanowires.
Figure 6B:
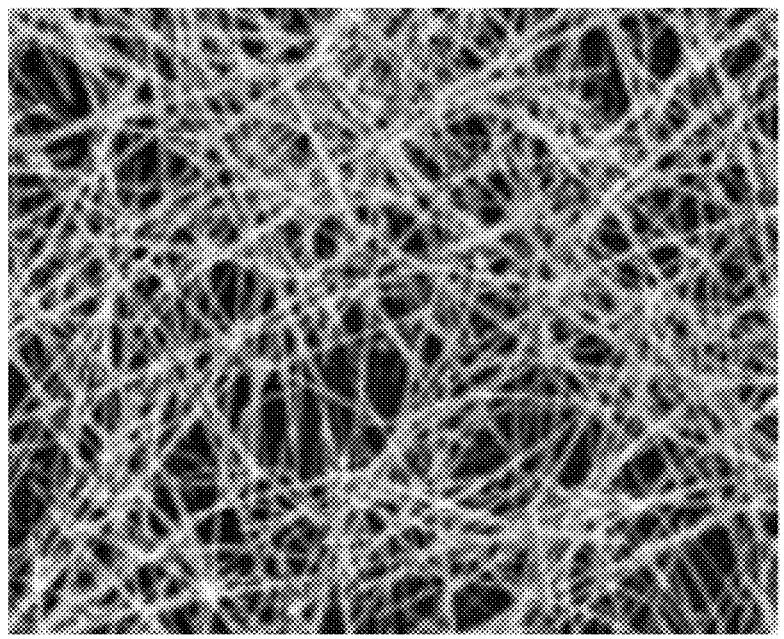
FIG. 6(B) SEM image of Ag nanowires grown in the presence of graphene sheets.

Studies using scanning electron microscopy (SEM) indicate that tens of nanowires can be grown or "extruded out" from a starting solid metal or metalloid particle. As an example, FIG. 4(A) shows that tens of Si nanowires have been sprouted or emanated from each Si particle that was originally 2-5 μm in diameter. These Si nanowires have drawn the needed Si atoms from the few starting Si particles. By spitting out a large number of nanowires, the original Si particles, if smaller than 2 μm in diameter, were fully expended. When larger particles having an original diameter >3 μm were used, there were typically some residual Si particles left. By spitting out such a large number of nanowires, the original Si particles (without the help from graphene sheets) were reduced to approximately 0.6 μm in diameter. With the presence of graphene sheets, essentially all the micron or sub-micron Si particles are totally "eaten"; there is typically no residual Si particles left and there are a huge number of finer Si nanowires produced (e.g. FIG. 4(B)).

SEM images of Cu nanowires and Ag nanowires are shown in FIGS. 5(A) & 5(B) and FIGS. 6(A) & 6(B), respectively.

There are several advantages associated with this process. For instance, there is no chemical reaction (such as converting $SiH_4$ into Si in a CVD process) and the process does not involve any undesirable chemical, such as silane, which is toxic. There is no danger of explosion, unlike the process of converting $SiO_2$ to Si using magnesium vapor. Other additional advantages will become more transparent later.

Figure 1A:
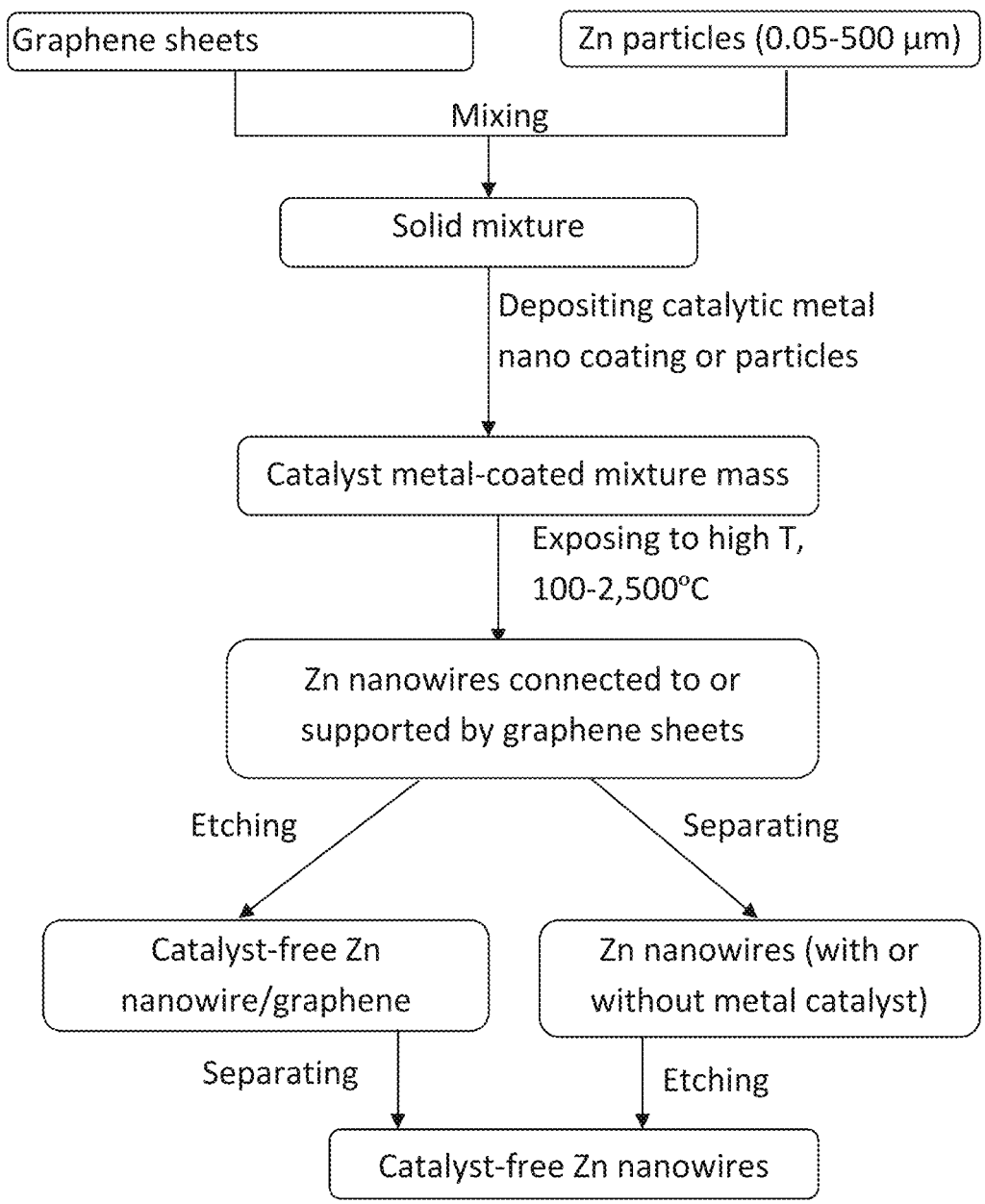
FIG. 1(A) A flow chart showing a preferred route to preparing metal nanowires from particles of the same metal material, having a diameter from 50 nm to 100 μm; using Zn as an example.
Figure 1B:
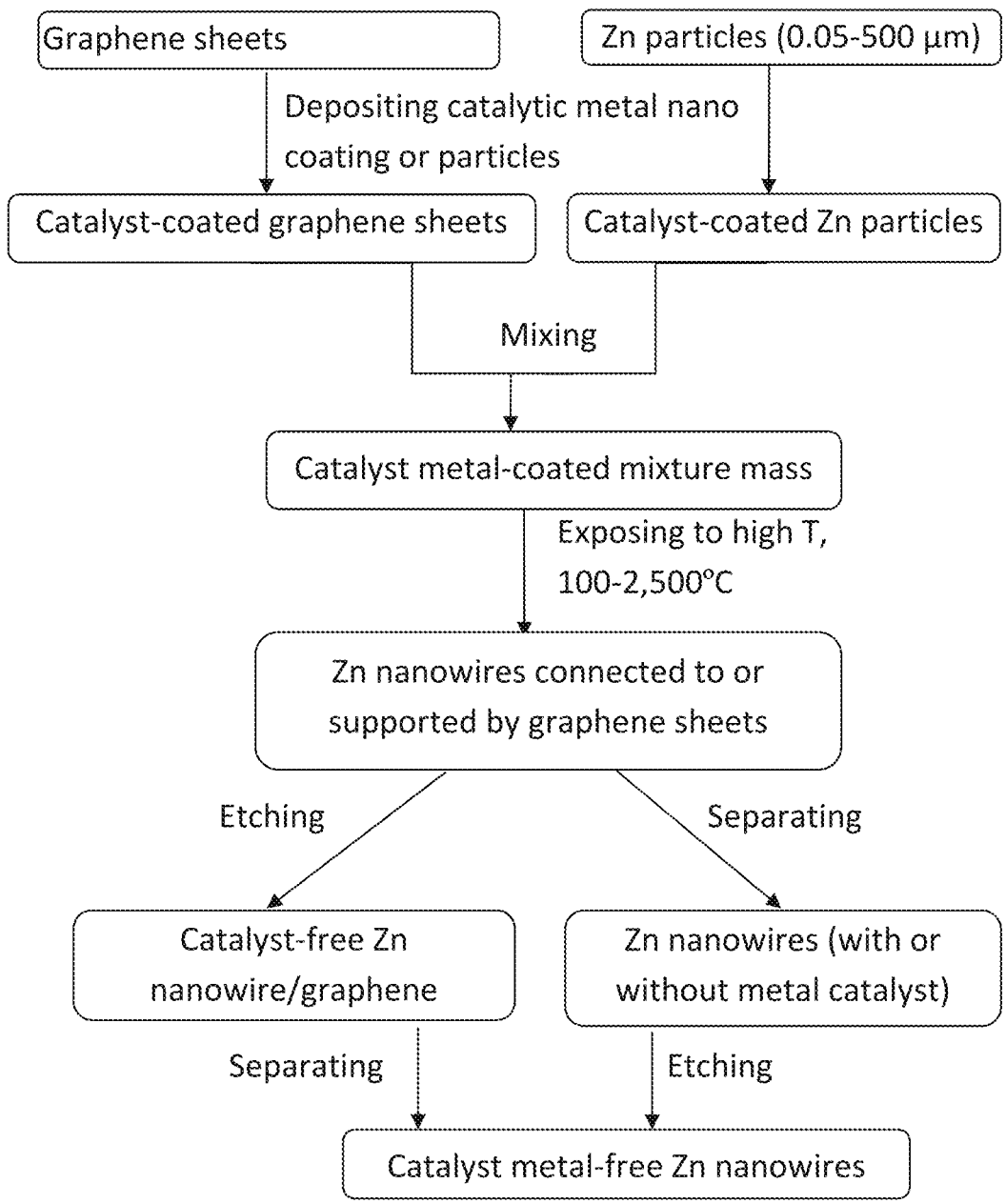
FIG. 1(B) A flow chart showing another preferred route to preparing metal nanowires from particles of the same metal material, having a diameter from 50 nm to 100 μm, using Zn as an example.

As illustrated in FIGS. 1(A) and 1(B), this process begins by preparing a catalyst metal-coated mixture mass (Procedure A), which includes (a) mixing exfoliated graphite flakes (having a thickness from 100 nm to 1 μm) or graphene sheets (having a thickness less than 10 nm) with micron or sub-micron scaled source metal particles to form a mixture and (b) depositing a catalytic metal onto surfaces of the graphene sheets (or expanded graphite flakes) and/or surfaces of the source metal particles. The step (a) of mixing and step (b) of catalyst metal deposition can occur sequentially (i.e. (a) after (b), or (b) after (a)), or concurrently. Preferably, the graphene sheets or exfoliated graphite flakes are positioned to have as many contact spots with source metal particles as possible. This can be accomplished by wrapping source metal particles with graphene sheets or exfoliated graphite flakes.

The catalytic metal is preferably in the form of a nanoscaled coating (having a thickness less than 100 nm, preferably less than 50 nm, more preferably less than 20 nm, and most preferably less than 10 nm) or nanoscaled particles (having a diameter less than 100 nm, preferably less than 50 nm, more preferably less than 20 nm, and most preferably less than 10 nm). Thinner metal coating or smaller particles of a catalytic metal are more effective in producing a larger number of smaller metal nanowires, which are preferred features when it comes to using metal nanowires as an anode active material of a lithium-ion battery.

In Procedure B, the catalyst metal-coated mixture mass is then exposed to a high temperature environment (preferably from 100° C. to 2,500° C., more preferably from 200° C. to 1,500° C., and most preferably and typically from 300° C. to 1,200° C.) for a period of time sufficient to enable a catalytic metal-catalyzed growth of multiple metal nanowires. These metal nanowires are emanated or extruded out from the source metal particles, which act as the source material for the growing metal nanowires to feed on. Additionally, even larger numbers of metal nanowires are emanated from surfaces of exfoliated graphite flakes or graphene sheets. This is most striking because there was no source metal material pre-deposited on surfaces of graphene sheets or exfoliated graphite flakes. The resulting mass is a hybrid material composed of graphene sheets and metal nanowires (plus residual metal nanoparticles). The metal nanowires have a diameter from 1 nm to 100 nm (more typically 2-20 nm) and a length that is typically 1-1000 μm (more typically 10-30 μm); hence, a length-to-diameter aspect ratio more typically from 10 to 10,000 (most typically from 100 to 1,000).

The graphene material (graphene sheets) may be selected from pristine graphene, graphene oxide, reduced graphene oxide, graphene fluoride, graphene bromide, graphene iodide, boron-doped graphene, nitrogen-doped graphene, chemically functionalized graphene, or a combination thereof. Preferably, the graphene material is selected from a single-layer sheet or few-layer platelet of pristine graphene, graphene oxide, reduced graphene oxide, graphene fluoride, graphene bromide, graphene iodide, boron-doped graphene, nitrogen-doped graphene, chemically functionalized graphene, or a combination thereof, wherein few layer is defined as less than 10 layers of graphene planes. The preparation of graphene materials and exfoliated graphite will be described in details in later sections and several examples.

The starting source metal particles preferably have a diameter from 100 nm to 10 μm, more preferably <3 μm. The starting metal particles are preferably spherical, cylindrical, or platelet (disc, ribbon, etc.) in shape, but can be of any shape. Metal particles of various shapes and various particle sizes are commercially available.

Figure 2:
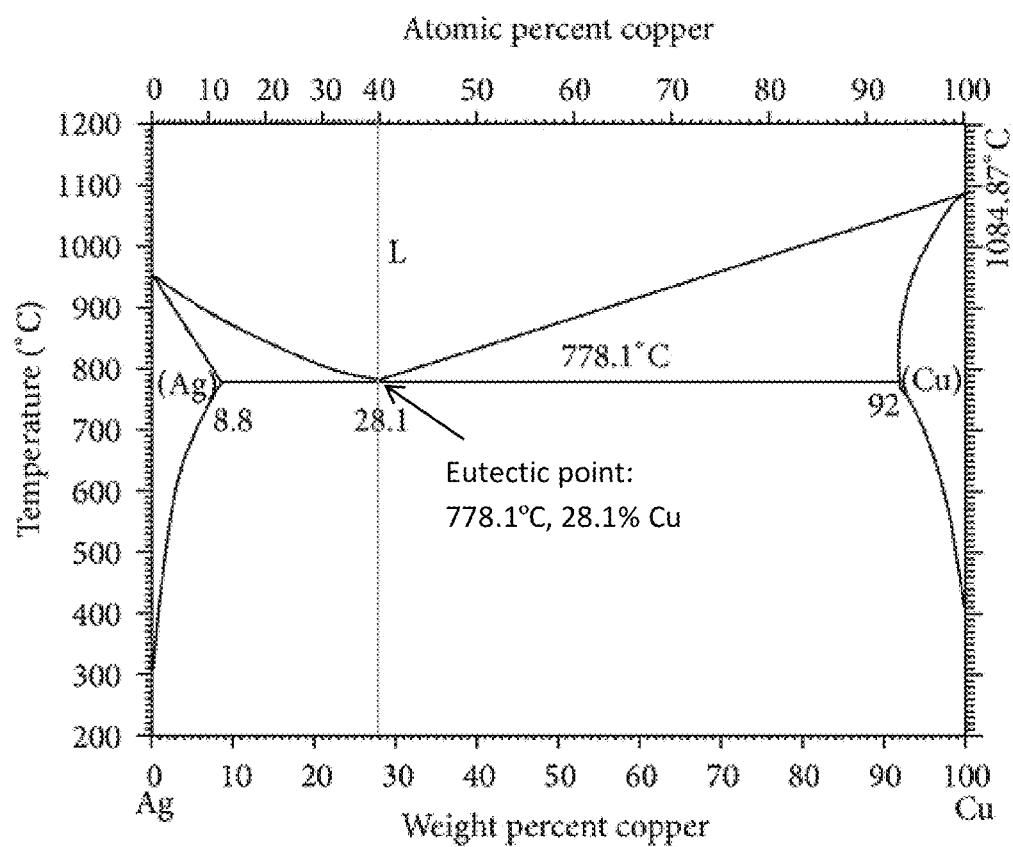
FIG. 2 Phase diagram of the Ag—Cu system, having a eutectic point: 778.1° C. and 28.1% Cu.
Figure 3:
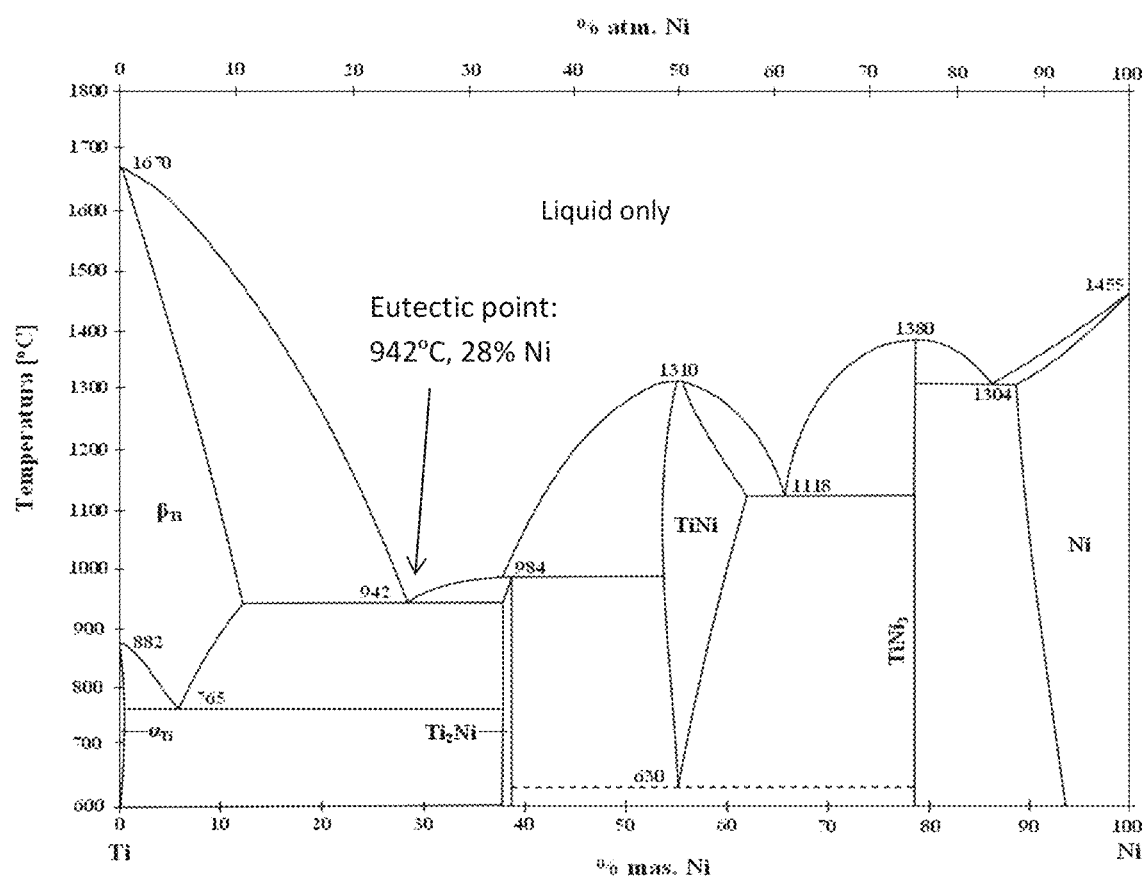
FIG. 3 Phase diagram of the Ti—Ni system, having a Eutectic point: 942° C., 28% Ni.

It may be noted that this high temperature range depends on the catalytic metal used, given the same source metal. Shown in FIG. 2 and FIG. 3 are phase diagrams of the Ag—Cu and Ti—Ni system, respectively. In the first example, Cu is the source metal material and Ag is the catalyst metal for the purpose of growing Cu nanowires. For the purpose of growing Ag nanowires, Ag is the source metal and Cu is the catalyst metal. In the second example, Ti is the source metal material and Ni is the catalyst metal for the purpose of growing Ti nanowires. For the purpose of growing Ni nanowires, Ni is the source metal and Ti is the catalyst metal.

In the Ag-Cu binary system, there exists a eutectic point at a eutectic temperature Te=778.1° C. and eutectic composition Ce=28.1% Cu (atomic percentage of Cu). A mass of Ag-coated Cu particles may be slowly heated to above Te (e.g. a high temperature from 778° C. to 930° C., which are lower than both the melting temperature of the source metal, 1084.9° C., and the melting temperature of the catalyst metal, 950° C.). The heating rate can be from 1 to 100 degrees/min (centigrade scale). One can allow the Ag-coated Cu particles to stay at this high temperature (say 850° C.) for 1 minute to 3 hours and then cool the material down to 790° C. (slightly above Te) and/or even 770° C. (slightly below Te) for 1-180 minutes. This will lead to the formation of Cu nanowires from the Ag-coated Cu particles. Alternatively, one may choose to cool the material slowly down from 850° C. (after staying at this temperature for a desired period of time) to room temperature.

In the Ti—Ni binary system, there exists a eutectic point at a eutectic temperature Te=942° C. and eutectic composition Ce=28% Ni (atomic percentage of Ni). A mass of Ni-coated Ti particles may be slowly heated to above Te (e.g. a high temperature from 950° C. to 1,450° C., which are lower than both the melting temperature of the source metal, 1,670° C., and the melting temperature of the catalyst metal, 1,455° C.). The heating rate can be from 1 to 100 degrees/min (centigrade scale). One can allow the Ni-coated Ti particles to stay at this high temperature (say 1,100° C.) for 1 minute to 3 hours and then cool the material down to 950° C. (slightly above Te) and/or even 935° C. (slightly below Te) for 1-180 minutes. This will lead to the formation of Ti nanowires from the Ni-coated Ti particles. Alternatively, one may choose to cool the materials slowly down from 1,100° C. (after staying at this temperature for a desired period of time) to room temperature.

In some embodiments, the step of depositing a catalytic metal includes: (a) dissolving or dispersing a catalytic metal precursor in a liquid to form a precursor solution; e.g. dissolving nickel nitrate, $Ni(NO_3)_2$, in water; (b) bringing the precursor solution in contact with surfaces of source metal particles and graphene sheets or exfoliated graphite flakes; e.g. immersing the particles/sheets/flakes into the $Ni(NO_3)_2$-water solution; (c) removing the liquid component; e.g. vaporizing water of the $Ni(NO_3)_2$-water solution, allowing $Ni(NO_3)_2$ to coat on the surfaces of the source metal particles and graphene sheets or exfoliated graphite flakes; and (d) chemically or thermally converting the catalytic metal precursor (e.g. $Ni(NO_3)_2$) to the catalytic metal coating or metal nanoparticles; e.g. by heating the $Ni(NO_3)_2$-coated mass at 450-650° C. in a reducing environment (e.g. in a flowing gas mixture of hydrogen and argon) to form Ni metal.

In one embodiment, the step (d) of chemically or thermally converting the catalytic metal precursor is conducted concurrently with the step of exposing the catalyst metal-coated source metal particles and graphene sheets or exfoliated graphite flakes to a high temperature environment.

In certain embodiments, the catalytic metal precursor is a salt or organo-metal molecule of a metal selected from Cu, Ni, Co, Mn, Fe, Ti, Al, Ag, Au, Pt, Pd, Pb, Bi, Sb, Zn, Cd, Ga, In, Zr, Te, P, Sn, Zr, Te, P, Se, or a combination thereof.

In some preferred embodiments, the catalytic metal precursor is selected from a nitrate, acetate, sulfate, phosphate, hydroxide, or carboxylate of a metal selected from Cu, Ni, Co, Mn, Fe, Ti, Al, Ag, Au, Pt, Pd, Pb, Bi, Sb, Zn, Cd, Ga, In, Zr, Te, P, Sn, Zr, Te, P, Se, or a combination thereof.

In some embodiments, the catalytic metal precursor is selected from a nitrate, acetate, sulfate, phosphate, hydroxide, or carboxylate of a transition metal. In certain embodiments, for instance, the catalytic metal precursor is selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper carboxylate, nickel carboxylate, cobalt carboxylate, manganese carboxylate, iron carboxylate, titanium carboxylate, aluminum carboxylate, or a combination thereof. Given the same metal particles, different types of precursor require different temperatures and/or chemical reactants for conversion to the catalytic metal phase. Different catalytic metals enable metal nanowire growth at different temperatures.

The step of depositing a catalytic metal may also be conducted by a procedure of physical vapor deposition (PVD), chemical vapor deposition (CVD), sputtering, plasma deposition, laser ablation, plasma spraying, ultrasonic spraying, printing, electrochemical deposition, electrode plating, electrodeless plating, chemical plating, or a combination thereof.

The step of mixing the metal particles and graphene sheets is conducted by liquid solution mixing, homogenizer mixing, high shearing mixing, wet milling, air milling, or ball-milling.

In an alternative embodiment, the mixing of graphene sheets with micron or sub-micron scaled metal particles is conducted after surfaces of the graphene sheets and/or the metal particles are deposited with the catalytic metal. This can be accomplished by using the above-described solution deposition procedure (i.e. dissolving nickel nitrate, copper acetate, etc. in a liquid, followed by liquid removal). Alternatively, ultra-thin coating or nanoparticles of a catalytic metal may be deposited on the surfaces of metal particles, graphene sheets, or exfoliated graphite flakes using sputtering, physical vapor deposition, chemical vapor deposition, laser ablation, etc.

The mixing of metal-coated graphene sheets (or exfoliated graphite flakes) with metal-coated micron or sub-micron scaled metal particles is conducted in such a manner that the resulting mixture is in a form of porous secondary particles having a diameter from 1 µm to 20 µm and having pores therein from 2 nm to 1.0 µm in size.

The procedure of exposing the catalyst metal-coated mixture mass to a high temperature environment is preferably conducted in a protective or reducing atmosphere of an inert gas, nitrogen gas, hydrogen gas, a mixture thereof, or in a vacuum.

It may be noted that the present process appears to enable metal nanowires to grow from both original source metal particle surfaces and surfaces of graphene sheets or exfoliated graphite flakes. A highly unexpected observation is the notion that a huge number of metal nanowires appear to grow out of surfaces of graphene sheets or exfoliated graphite flakes as well. These metal nanowires appear to emanate from these sheet/flake surfaces everywhere, even though that there was no pre-deposited source metal material on these surfaces and there were limited initial contact points between graphene sheets and original source metal particles (i.e. there was very limited amount of source metal on graphene surfaces). With the presence of graphene sheets or thin exfoliated graphite flakes, the number of metal nanowires is typically 1 or 2 orders of magnitude larger than that in the samples containing metal particles alone, without the presence of metal-coated graphene sheets or graphite flakes. Additionally, the resulting metal nanowires are significantly smaller in diameter, typically thinner than 35 nm (more typically from 2 nm to 20 nm), in contrast to the typically >35 nm (more typically >50 nm and most typically >60 nm) for those metal nanowires grown directly from original source metal particles. Furthermore, metal-coated graphene sheets were found to be more effective than metal-coated exfoliated graphite flakes in emanating thin metal nanowires. These are highly desirable attributes considering that smaller metal nanowire diameters imply shorter diffusion paths for lithium ions and, hence, faster charge and discharge procedures for the lithium-ion batteries.

Typically, in the resulting hybrid material, multiple graphene sheets and catalytic metals are present along with the produced metal nanowires. For certain applications, one may choose to use metal nanowires without graphene. Hence, in an embodiment, the process may further comprise a procedure of separating the graphene sheets from the silicon nanowires.

In one embodiment, the process may further comprise a procedure of removing the residual catalytic metal from the metal nanowires; for instance, via chemical etching or electrochemical etching.

In a desired embodiment, the process of producing metal nanowires is followed by a procedure of incorporating a carbonaceous or graphitic material into the mass of multiple silicon nanowires as a conductive additive in the preparation of an anode electrode. This carbonaceous or graphitic material may be selected from a chemical vapor deposition carbon, physical vapor deposition carbon, amorphous carbon, chemical vapor infiltration carbon, polymeric carbon or carbonized resin, pitch-derived carbon, natural graphite, artificial graphite, mesophase carbon, mesophase pitch, mesocarbon microbead, soft carbon, hard carbon, coke, carbon fiber, carbon nanofiber, carbon nanotube, carbon black, or a combination thereof.

For instance, multiple metal nanowires may be readily packed into a porous membrane or mat (with or without a small amount of resin binder), which may be impregnated or infiltrated with carbon under a chemical vapor deposition (CVD) or chemical vapor infiltration condition. This may be accomplished by introducing methane or ethylene gas into the system at a temperature of 500-1,500° C. Alternatively, one may impregnate the porous metal nanowire membrane with a resin or pitch, which is then heated to carbonize the resin or pitch at a temperature of 350-1,500° C. Alternatively, one may simply blend metal nanowires with particles of a carbon or graphite material with an optional binder resin to form a multi-component mixture.

The following is a more detailed description of the procedures that can be used to produce exfoliated graphite flakes and various types of graphene sheets:

In a preferred embodiment, the graphene material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The electrode material may be selected from an exfoliated graphite material. The starting graphitic material for producing any one of the above graphene or exfoliated graphite materials may be selected from natural graphite, artificial graphite, mesophase carbon, mesophase pitch, mesocarbon microbead, soft carbon, hard carbon, coke, carbon fiber, carbon nanofiber, carbon nanotube, or a combination thereof.

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nanographene platelets" (NGPs). Graphene sheets/platelets (collectively, NGPs) are a new class of carbon nanomaterial (a 2-D nanocarbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nanofiber (CNF).

Our research group pioneered the development of graphene materials and related production processes as early as 2002: (1) B. Z. Jang and W. C. Huang, "Nanoscaled Graphene Plates," U.S. Pat. No. 7,071,258 (Jul. 4, 2006), application submitted on Oct. 21, 2002; (2) B. Z. Jang, et al. "Process for Producing Nanoscaled Graphene Plates," U.S. patent application Ser. No. 10/858,814 (Jun. 3, 2004) (U.S. Pat. Pub. No. 2005/0271574); and (3) B. Z. Jang, A. Zhamu, and J. Guo, "Process for Producing Nanoscaled Platelets and Nanocomposites," U.S. patent application Ser. No. 11/509,424 (Aug. 25, 2006) (U.S. Pat. Pub. No. 2008/0048152).

Figure 7:
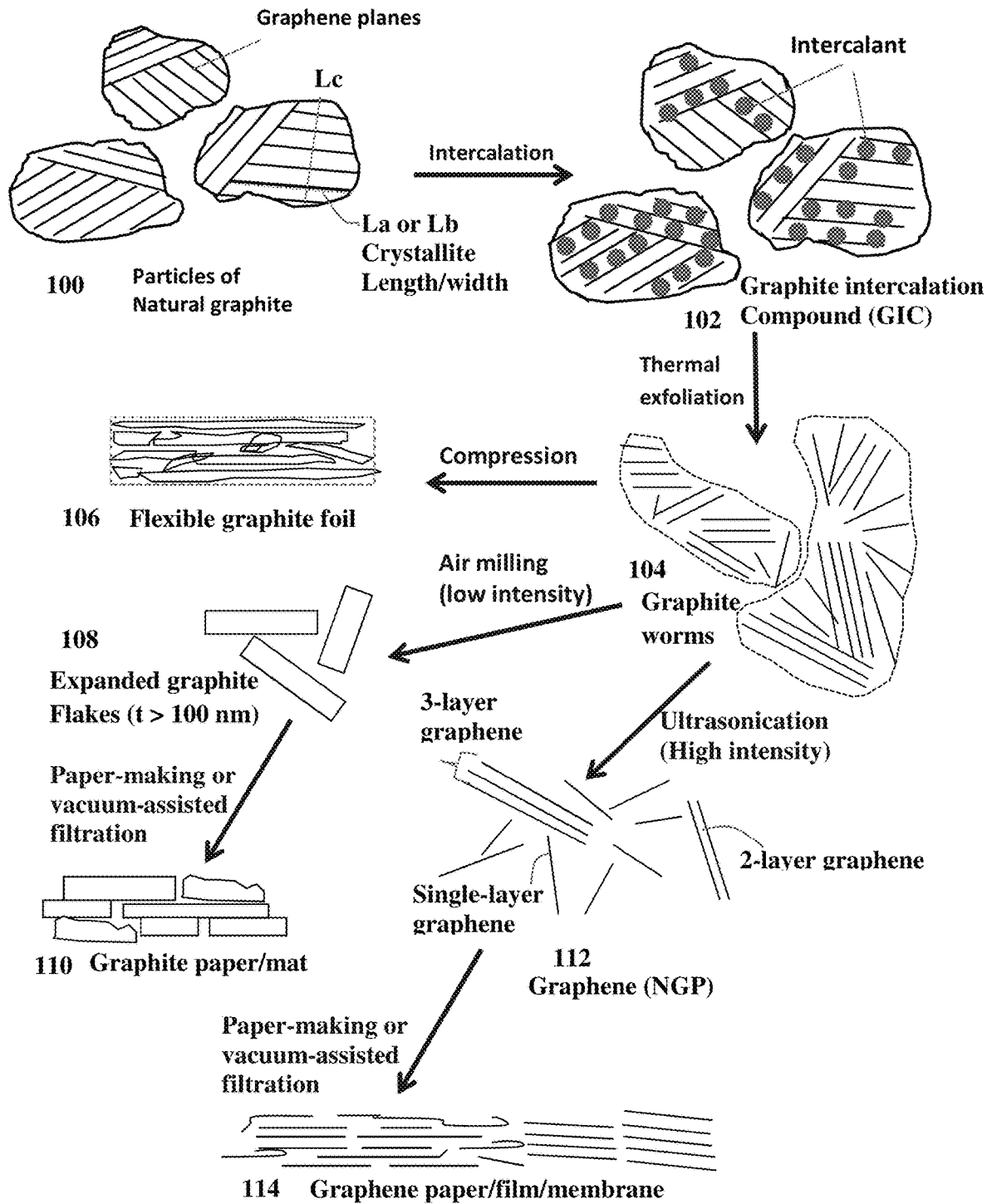
FIG. 7 Schematic drawing to illustrate the process for producing exfoliated graphite, expanded graphite flakes, and graphene sheets.

In one process, graphene materials are obtained by intercalating natural graphite particles with a strong acid and/or an oxidizing agent to obtain a graphite intercalation compound (GIC) or graphite oxide (GO), as illustrated in FIG. 7) (schematic drawing). The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (100 in FIG. 7)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range from typically 800-1,050° C. for approximately 30 seconds to 2 minutes, the GIC undergoes a rapid volume expansion by a factor of 30-300 to form "graphite worms" (104), which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils (106) that typically have a thickness in the range from 0.1 mm (100 μm)-0.5 mm (500 μm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nanomaterial by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814 (Jun. 3, 2004) (U.S. Pat. Pub. No. 2005/0271574). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphene structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Pristine graphene, in smaller discrete graphene sheets (typically 0.3 μm to 10 μm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium.

The nitrogenation of graphene can be conducted by exposing a graphene material, such as graphene oxide, to ammonia at high temperatures (200° C.-400° C.). Nitrogenated graphene could also be formed at lower temperatures by a hydrothermal method; e.g. by sealing GO and ammonia in an autoclave and then increased the temperature to 150° C.-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The aforementioned features are further described and explained in detail as follows: As illustrated in FIG. 7, a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 7, different crystallites in a graphite particle are typically oriented in different directions and, hence, a particular property of a multi-crystallite graphite particle is the directional average value of all the constituent crystallites.

Figure 8A:
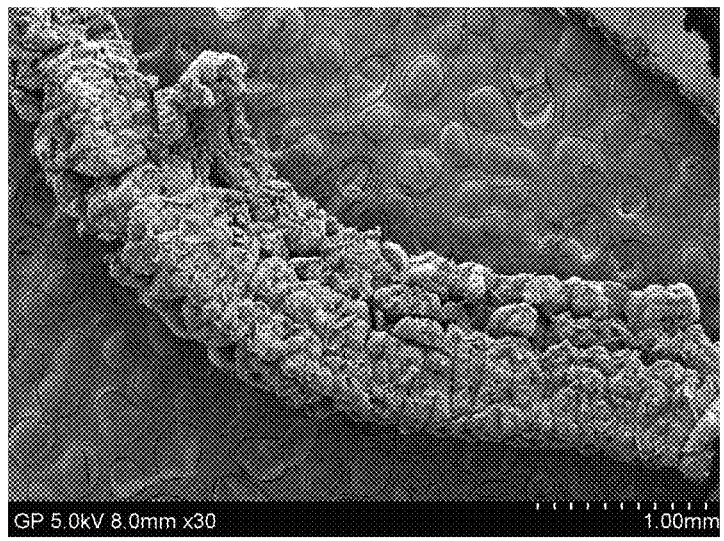
FIG. 8(A) SEM images of exfoliated graphite worms imaged at a low magnification.
Figure 8B:
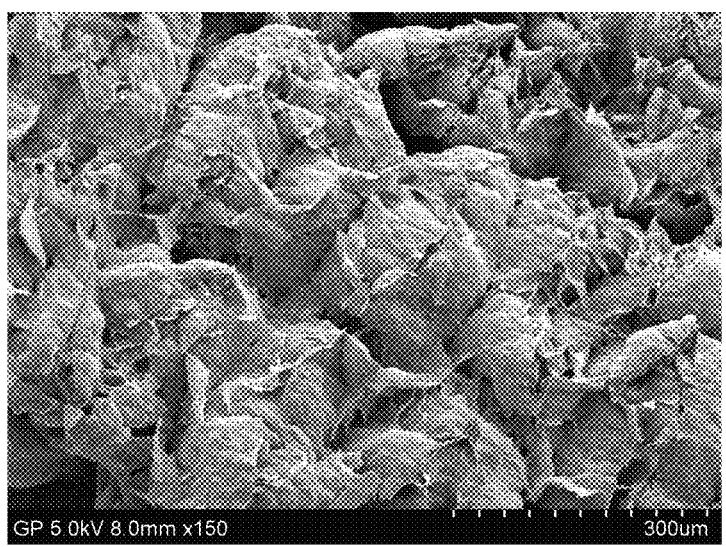
FIG. 8(B) Same graphite worm as in FIG. 8(A), but taken at a higher magnification FIG. 9 The effect of nanowire diameter on the rate capability of an anode active material in a lithium-ion battery.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 7) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as graphite worms 104. Examples of exfoliated graphite worms (or, simply, graphite worms) are presented in FIGS. 8(A) and 8(B). These worms of graphite flakes can be subjected to a low-intensity mechanical shearing to produce flakes of exfoliated graphite, also sometimes referred to as expanded graphite flakes. High-intensity shearing of graphite worms tends to produce graphene sheets, also referred to as nanographene platelets (NGPs).

Acids, such as sulfuric acid, are not the only type of intercalating agent (intercalant) that penetrate into spaces between graphene planes to obtain GICs. Many other types of intercalating agents, such as alkali metals (Li, K, Na, Cs, and their alloys or eutectics), can be used to intercalate graphite to stage 1, stage 2, stage 3, etc. Stage n implies one intercalant layer for every n graphene planes. For instance, a stage-1 potassium-intercalated GIC means there is one layer of K for every graphene plane; or, one can find one layer of K atoms inserted between two adjacent graphene planes in a G/K/G/K/G/KG . . . sequence, where G is a graphene plane and K is a potassium atom plane. A stage-2

GIC will have a sequence of GG/K/GG/K/GG/K/GG . . . and a stage-3 GIC will have a sequence of GGG/K/GGG/K/GGG . . . , etc. These GICs can then be brought in contact with water or water-alcohol mixture to produce exfoliated graphite and/or separated/isolated graphene sheets.

Exfoliated graphite worms may be subjected to a high-intensity mechanical shearing/separation treatment using a high-intensity air jet mill, high-intensity ball mill, or ultrasonic device to produce separated nanographene platelets (NGPs) with all the graphene platelets thinner than 100 nm, mostly thinner than 10 nm, and, in many cases, being single-layer graphene (also illustrated as 112 in FIG. 7). An NGP is composed of a graphene sheet or a plurality of graphene sheets with each sheet being a two-dimensional, hexagonal plane of carbon atoms. Alternatively, with a low-intensity shearing, graphite worms tend to be separated into the so-called expanded graphite flakes (108 in FIG. 7) having a thickness >100 nm.

These flakes, along with starting metal particles, can be formed into porous paper or mat 106 using a paper- or mat-making process, with or without a resin binder. This can be conducted before, during, or after catalytic metal deposition. In one preferred embodiment of the present invention, the porous web can be made by using a slurry molding or a flake spraying technique. These methods can be carried out in the following ways:

As a wet process, aqueous slurry is prepared which comprises a mixture of graphene sheets or expanded graphite flakes and a desired amount of micron or sub-micron metal particles. A water solution of metal salt may also be added to the slurry. The slurry is then directed to impinge upon a sieve or screen, allowing water to permeate through, leaving behind sheets/flakes/particles. The slurry may also be sprayed dried to form secondary particles containing graphene sheets (or exfoliated graphite flakes), metal particles, and catalytic metal salt (if present) coated on surfaces of metal and graphene sheets (or exfoliated graphite flakes).

As a dry process, the directed sheet/flake spray-up process utilizes an air-assisted flake/particle spraying gun, which conveys flakes/sheets/particles to a molding tool (e.g., a perforated metal screen shaped identical or similar to the part to be molded). Air goes through perforations, but the solid components stay on the molding tool surface.

Each of these routes can be implemented as a continuous process. For instance, the process begins with pulling a substrate (porous sheet) from a roller. The moving substrate receives a stream of slurry (as described in the above-described slurry molding route) from above the substrate. Water sieves through the porous substrate with all other ingredients (a mixture of graphene sheets or graphite flakes, optional conductive fillers, and metal particles) remaining on the surface of the substrate being moved forward to go through a compaction stage by a pair of compaction rollers. Heat may be supplied to the mixture before, during, and after compaction to help cure the thermoset binder (if present) for retaining the shape of the resulting web or mat. The web or mat, with all ingredients held in place by the thermoset binder, may be stored first (e.g., wrapped around a roller). Similar procedures may be followed for the case where the mixture is delivered to the surface of a moving substrate by compressed air, like in a directed fiber/binder spraying process. Air will permeate through the porous substrate with other solid ingredients trapped on the surface of the substrate, which are conveyed forward. The subsequent operations are similar than those involved in the slurry molding route.

Other processes that can be used to produce mixtures of source metal particles and graphene sheets or exfoliated graphite flakes include, for instance, spray drying of slurry containing the mixture, wet milling, ball milling, impact milling, tumbling drying, freeze-drying, etc.

In a desired embodiment, the process of producing a graphene-metal nanowire hybrid material composition further comprises a procedure of incorporating a carbonaceous or graphitic material into the graphene-metal nanowire hybrid material composition as a conductive additive. This carbonaceous or graphitic material is selected from a chemical vapor deposition carbon, physical vapor deposition carbon, amorphous carbon, chemical vapor infiltration carbon, polymeric carbon or carbonized resin, pitch-derived carbon, natural graphite, artificial graphite, mesophase carbon, mesophase pitch, mesocarbon microbead, soft carbon, hard carbon, coke, carbon fiber, carbon nanofiber, carbon nanotube, carbon black, or a combination thereof.

For instance, the graphene-metal nanowire hybrid material composition, in a porous membrane form, may be impregnated or infiltrated with carbon under a chemical vapor deposition (CVD) or chemical vapor infiltration condition. This may be accomplished by introducing methane or ethylene gas into the system at a temperature of 500° C.-1,500° C. Alternatively, one may impregnate the porous graphene-metal nanowire hybrid material composition with a resin or pitch, which is then heated to carbonize the resin or pitch at a temperature of 350° C.-1,500° C. Alternatively, one may simply mix the particulates of graphene-metal nanowire hybrid material composition with particles of a carbon or graphite material to form a multi-component mixture.

The following examples are provided for the purpose of illustrating the best mode of practicing the present invention and should not be construed as limiting the scope of the instant invention.

EXAMPLE 1

Preparation of Graphene Oxide (GO) and Reduced GO Nanosheets from Natural Graphite Powder and their Porous Paper/Mats Containing Ge Particles and/or Metal Salt Natural graphite was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation procedure, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt. % $H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt. % of GO, as estimated from dry extracts. Subsequently, liquid dispersions of GO platelets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt. %) and deoxycholate sodium (50 wt. %) salts provided by Sigma Aldrich was used. The surfactant weight fraction was 0.5 wt. %. This fraction was kept constant for all samples. Sonication was performed using a Branson Sonifier S-250A equipped with a 13 mm step disruptor horn and a 3 mm tapered microtip, operating at a 20 kHz frequency. For instance, 10 mL of aqueous solutions containing 0.1 wt. % of GO was sonicated for 10 min and subsequently centrifuged at 2700 g for 30 min to remove any non-dissolved large particles, aggregates, and impurities. A desired amount of Ag particles were then added to the GO-water suspension to form a slurry sample.

Chemical reduction of as-obtained GO to yield RGO was conducted by using the following method: The procedure began with placing 10 mL of a 0.1 wt. % GO aqueous solution in a boiling flask of 50 mL. Then, 10 μL of a 35 wt. % aqueous solution of $N_2H_4$ (hydrazine) and 70 mL of a 28 wt. % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction. A desired amount of Ag particles were then added to the suspensions (RGO in surfactant water) to form a slurry sample.

These GO-Ag and RGO-Ag slurry samples were then filtered through a vacuum-assisted membrane filtration apparatus to obtain porous layers (membranes) of GO-Ag and RGO-Ag paper or mat. These mat/paper membranes were then impregnated with a solution of copper acetate in water. Water was subsequently removed from the impregnated membranes and the dried membranes were then exposed to a reducing atmosphere of $H_2$ and Ar gas following a desired temperature profile, typically from room temperature to a reduction temperature of approximately 300-600° C. (for reduction of copper nitrate to Cu nanocoating, for instance). The temperature was continued to rise to a final temperature of 870° C. for 2 hours and then cooled down to 780° C. (slightly above Te) and stayed at 780° C. for 1 hour, followed by naturally cooling down to room temperature. Ag nanowires were found to emanate from both existing Ag particles and graphene sheets (both GO and RGO sheets, separately). The diameter of the Ag nanowires was observed to be from approximately 12 nm to 18 nm.

COMPARATIVE EXAMPLE 1a

Cu-Assisted Growth of Ag Nanowires from Ag Particles

The Ag particles were immersed in a solution of copper acetate in water. Water was subsequently removed and the dried Ag particles were coated with a thin layer of copper acetate. These metal precursor-coated Ag particles were then exposed to a heat treatment in a reducing atmosphere of $H_2$ and Ar gas according to a desired temperature profile. This profile typically included from room temperature to a reduction temperature of approximately 300° C.-600° C. (for reduction of copper acetate to Cu nanocoating). A mass of Cu-coated Ag particles was further heated to above Te (e.g. a high temperature from 870° C.). The heating rate was 10 degrees/min (centigrade scale). The Cu-coated Ag particles were allowed to stay at this high temperature (870° C.) for 2 hours and then cooled down to 780° C. (slightly above Te) and stayed at 780° C. for 1 hour, followed by naturally cooling down to room temperature. This led to the formation of Ag nanowires from the Cu-coated Ag particles. The diameter of Ag nanowires produced is in the range from 23 nm to 46 nm.

EXAMPLE 2

Preparation of Single-Layer Graphene Sheets and Porous Graphene Mats from Mesocarbon Microbeads (MCMBs) to Support/Promote Growth of Metal Nanowires Mesocarbon microbeads (MCMBs) were supplied from China Steel Chemical Co., Kaohsiung, Taiwan. This material has a density of about 2.24 g/cm$^3$ with a median particle size of about 16 μm. In one example, MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultrasonication for 10-100 minutes to fully exfoliate and separate GO sheets. TEM and atomic force microscopic studies indicate that most of the GO sheets were single-layer graphene when the oxidation treatment exceeded 72 hours, and 2- or 3-layer graphene when the oxidation time was from 48 to 72 hours. The GO sheets contain oxygen proportion of approximately 35%-47% by weight for oxidation treatment times of 48-96 hours.

The GO suspension was then diluted to approximately 0.5% by weight in a container. A desired amount of nickel nitrate was dissolved in water to form a metal salt solution. The metal salt solution was then added into a GO suspension, followed by addition of Ti particles to form slurry samples. The slurries were allowed to age in the container without mechanical disturbance. The slurries were then cast onto a glass surface using a doctor's blade to exert shear stresses, inducing GO sheet orientations. The resulting GO/Ti/Ni metal salt films, after removal of liquid, have a thickness that can be varied from approximately 10 to 500 μm. The resulting GO/Ti/metal salt compact was then exposed to a heat treatment in a reducing atmosphere of $H_2$ and Ar gas according to a desired temperature profile. This profile typically included from room temperature to a reduction temperature of approximately 300° C.-700° C. (for reduction of nickel nitrate to Ni nanocoating). The temperature was continued to rise to a final temperature of 1,200° C. and stayed at this temperature for 3 hours and the system was allowed to cool down naturally. This heat treatment could concurrently accomplish four things: reduction of GO to RGO, reduction of Ni metal salt to Ni metal nanocoating, formation of pores (2 nm-10 μm) due to evolution of volatile reaction product species (e.g. $CO_2$, $H_2O$, etc.), and catalytic metal assisted growth of Ti nanowires from Ti particles and graphene sheets.

As a baseline experiment, we have also prepared a slurry containing Ti particles (but no graphene sheets) in water with a corresponding metal salt dissolved therein. This was followed by casting and heat-treating under comparable conditions for comparison purposes.

In each sample containing graphene, a huge number of Ti nanowires appear to have grown out of graphene sheet surfaces. These Ti nanowires appear to emanate from everywhere on these sheet surfaces. With the presence of graphene sheets, the number of Ti nanowires is typically 1 or 2 orders of magnitude larger than that in the samples containing Ti particles alone, without the presence of graphene sheets. Additionally, the resulting Ti nanowires emanated from graphene surfaces are significantly smaller in diameter, typically thinner than 20 nm (more typically 7-18 nm), in contrast to the typically >35 nm for those Ti nanowires grown directly from original Ti particles.

EXAMPLE 3

Ag-Assisted Growth of Cu Nanowires from Cu Particles

An amount of Cu powder, with or without graphene sheets, was exposed to Ag sputtering to obtain a mass of Ag-coated Cu particles or a mixture mass of Ag-coated Cu particles and Ag-coated graphene sheets. A mass of Ag-coated Cu particles and a mixture mass were slowly heated to above Te (reaching 880° C.>Te). The heating rate was 20 degrees/min (centigrade scale). The material systems were allowed to stay at this high temperature (880° C.) for 1 hour and then cooled down to 790° C. (slightly above Te) and stayed at 790° C. for 1 hour, followed by naturally cooling down to room temperature. This led to the formation of Cu nanowires from the Ag-coated Cu particles. In the absence of graphene sheets, the diameter of Cu nanowires produced is in the range from 23 nm to 46 nm. With graphene sheets, the diameter of Cu nanowires is from 10 nm to 21 nm.

EXAMPLE 4

Preparation of Pristine Graphene Sheets/Platelets (0% Oxygen) and the Effect of Pristine Graphene Sheets on Metal Nanowire Growth Pristine graphene sheets (non-oxidized and oxygen-free) were produced by using the direct ultrasonication or liquid-phase production process. In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free.

Several approaches were followed to produce Zn, Cd, Ag, Al, and Mg nanowire-graphene hybrid materials from pristine graphene sheets and micron-scaled metal particles:
(1) Mixing un-coated source metal particles and un-coated graphene sheets in a precursor catalyst metal salt-water solution to make a slurry, which was then spray-dried to form secondary mixture particulates (3-15 μm in diameter), while concurrently enabling deposition of catalytic metal salt onto surfaces of source metal particles and graphene sheets;
(2) Mixing metal salt-coated source metal particles and un-coated graphene sheets (having a specific surface area of 430 $m^2/g$-885 $m^2/g$) to form secondary mixture particulates; and
(3) Mixing un-coated source metal particles and catalytic metal salt-coated graphene sheets (having a specific surface area of 350 $m^2/g$-790 $m^2/g$) to form secondary mixture particulates.

In the latter two approaches, either source metal particles or graphene sheets were dispersed in a catalytic metal salt-water solution to form a suspension. Subsequently, water was removed to allow for deposition of catalytic metal salt onto source metal particle or sheet surfaces. The catalytic metal salt was then thermally converted to catalyst metal in the form of nanometal coating or metal nanoparticles deposited on surfaces of source metal particles or graphene sheets. For comparison purposes, deposition of metal catalyst onto source metal particles or various graphene sheets (pristine graphene, RGO, and GO) was also carried out by using sputtering.

By using SEM to examine starting source metal particles and graphene sheets as well as the resulting metal nanowires and metal nanowire-graphene hybrid particulates, we made some important discoveries, summarized below:

(A) Hybrid particulates containing both catalyst metal-coated source metal particles and metal-coated graphene sheets are dramatically more effective in promoting growth of nanowires than those particulates that contain catalyst metal-coated source metal particles and un-coated graphene sheets and those un-coated source metal particles and metal-coated graphene sheets. Under comparable conditions, the former produces a dramatically larger number of metal nanowires (by 1 to 2 orders of magnitude), and the nanowires are significantly smaller in diameter (typically from 2 nm to approximately 20 nm), in contrast to typically 35-100 nm of metal nanowires produced by the latter two types of particulates.

(B) The number of metal nanowires that can be emanated from a catalyst metal-coated source metal particle per unit volume of source metal particle in a particulate containing un-coated graphene sheets and coated source metal particles appears to be controlled by the total surface area of the catalytic metal deposited on the source metal particles and graphene surfaces per unit volume of source metal particles. Uncoated graphene sheets do not seem to contribute to the growth of metal nanowires. Larger source metal particles lead to smaller number of metal nanowires per unit volume of original source metal.

(C) In hybrid particulates that contain un-coated source metal particles and metal-coated graphene sheets, metal nanowires appear to nucleate mainly from those interface areas where catalyst metal-coated graphene sheets contact a source metal particle.

(D) We have further observed that a larger number of smaller-diameter metal nanowires, given the same source metal amount, enable a battery anode active material featuring the presently invented hybrid material to deliver a higher specific capacity at both low and high charge/discharge rates, a higher energy density, higher power density, and longer battery cycle life.

EXAMPLE 5

Tin-Assisted Growth of Zn Nanowires from Zn Particles and Graphene/Zn Mixtures A mass of Zinc particles, a mixture mass of Zn particles and graphene sheets (graphene fluoride prepared in Example 7), and a mixture of Zn particles and exfoliated graphite (prepared in Example 10), respectively, were coated with a thin layer of Sn using a simple physical vapor deposition up to a thickness of 1.3-3.7 nm. The Sn—Zn system is known to have a eutectic point at Te=198.5° C. and Ce=14.9% Zn. A powder mass of Sn-coated Zn particles (2.2 µm in diameter) and a powder mixture mass, respectively, were heated to 220° C. and allowed to stay at 220° C. for 1 hour and then cooled down to 200° C. and maintained at 200° C. for 30 minutes. The material systems were then naturally cooled to room temperature after switching off the power to the oven.

The Zn nanowires grown from Zn particles without the presence of graphene sheets were found to have diameters in the approximate range of 27-66 nm. With assistance from graphene sheets and exfoliated graphite, the diameter of Zn nanowires was in the range from 15 to 25 nm and from 22 nm to 35 nm, respectively. Nanowires having a smaller diameter are more high-rate capable, being able to deliver a higher specific capacity when the lithium-ion battery is charged or discharged.

EXAMPLE 6

Zinc-Assisted Growth of Mg Nanowires from Mg Particles

A powder mass of Mg particles, a mixture of Mg particles and graphene sheets (nitrogenated graphene prepared in Example 8), and a mixture of Mg particles and expanded graphite flakes (prepared in Example 9), respectively, were deposited with a thin film of Zn using an electroplating method. Zn-coated Mg particles, with or without graphene sheets, were heated to 500° C. and maintained at this temperature for 2 hours in a protective atmosphere ($H_2/N_2$-10/90 ratio gas mixture). The material systems were then cooled down to approximately 360° C., stayed at this temperature for 1 hour and then cooled down to room temperature. Both expanded graphite flakes and graphene sheets were found to be effective in promoting growth of metal nanowires having smaller diameters (8-15 nm, graphene-assisted; 13-25 nm, expanded graphite-assisted; and 33-56 nm, un-assisted). Mg nanowires having smaller diameters are particularly useful for use as an electrode active material in a Mg-ion battery that exhibits high-rate capability.

EXAMPLE 7

Preparation of Graphene Fluoride (GF) Nanosheets to Promote Metal Nanowire Growth Several processes have been used by us to produce GF, but only one process is herein described as an example. In a typical procedure, highly exfoliated graphite (HEG) was prepared from intercalated compound $C_2F$-$xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, or isoamyl alcohol) and subjected to an ultrasound treatment (280 W) for 30 min, leading to the formation of homogeneous yellowish dispersions. Five minutes of sonication was enough to obtain a relatively homogenous dispersion of few-layer graphene fluoride, but longer sonication times ensured the production of mostly single-layer graphene fluoride sheets. Some of these suspension samples were subjected to vacuum oven drying to recover separated graphene fluoride sheets.

EXAMPLE 8

Preparation of Nitrogenated Graphene Nanosheets and Porous Graphene Structures Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratio of 1/1 had a nitrogen content of 18.2 wt. % as determined by elemental analysis. These nitrogenated graphene sheets remain dispersible in water.

EXAMPLE 9

Exfoliated Graphite Worms from Natural Graphite

Natural graphite, nominally sized at 45 µm, provided by Asbury Carbons (405 Old Main St., Asbury, N.J. 08802, USA) was milled to reduce the size to approximately 14 µm. The chemicals used in the present study, including fuming nitric acid (>90%), sulfuric acid (95-98%), potassium chlorate (98%), and hydrochloric acid (37%), were purchased from Sigma-Aldrich and used as received.

A reaction flask containing a magnetic stir bar was charged with sulfuric acid (360 mL) and nitric acid (180 mL) and cooled by immersion in an ice bath. The acid mixture was stirred and allowed to cool for 15 min, and graphite (20 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 48 hours at room temperature. On completion of the reaction, the mixture was poured into 8 L of deionized water and filtered. The slurry was spray-dried to recover an expandable graphite sample. The dried, expandable graphite was quickly placed in a tube furnace preheated to 1,000° C. and allowed to stay inside a quartz tube for approximately 40 seconds to obtain exfoliated graphite worms. Portions of the exfoliated graphite worms were broken into expanded graphite flakes.

Some of the graphite worms were then mixed with source metal particles and the resulting mixture was exposed to catalyst metal cloud in a sputtering chamber. The catalyst metal-coated mixture was roll-pressed to obtain samples of re-compressed exfoliated graphite having a range of physical densities (e.g. 0.3 to 1.2 g/cm$^3$).

Some of the graphite worms were subjected to low-intensity sonication to produce separated (isolated) expanded graphite flakes. These expanded graphite flakes, after being blended with source metal particles and catalytic metal salt (e.g. zinc nitrate, nickel acetate, etc.) in water solution, were then cast into layers of porous membrane.

EXAMPLE 10

Exfoliated Graphite Worms from Various Synthetic Graphite Particles or Fibers

Additional exfoliated graphite worms were prepared according to the same procedure described in Example 7, but the starting graphite materials were graphite fiber (Amoco P-100 graphitized carbon fiber), graphitic carbon nanofiber (Pyrograph-III from Applied Science, Inc., Cedarville, Ohio), spheroidal graphite (HuaDong Graphite, QinDao, China), and mesocarbon microbeads (MCMBs) (China Steel Chemical Co., Taiwan), respectively. These four types of laminar graphite materials were intercalated and exfoliated under similar conditions as used for Example 1 for different periods of time, from 24 hours to 96 hours.

Some of the graphite worms were then mixed with Mg particles and the resulting mixture was then coated with Zn. The metal-coated mixture was roll-pressed to obtain samples of re-compressed exfoliated graphite having a range of physical densities (e.g. 0.3 to 1.2 g/cm$^3$). Some of the graphite worms were subjected to low-intensity sonication to produce separated (isolated) expanded graphite flakes. These expanded graphite flakes, after blended with Mg particles and metal salt in water solution, were then cast into layers of porous membrane.

The Mg-exfoliated graphite mixtures were gradually heated to 500° C. and maintained at this temperature for 2 hours in a protective atmosphere ($H_2/N_2$-10/90 ratio gas mixture). The material systems were then cooled down to approximately 360° C., stayed at this temperature for 1 hour and then cooled down to room temperature after switching off the power to the oven.

EXAMPLE 11

Lithium-Ion Batteries Featuring Cd and Zn Nanowires as an Anode Active Material

For electrochemical testing, several types of anodes and cathodes were prepared. For instance, a layer-type of anode was prepared by simply coating slurry of Cd or Zn nanowires, conductive additives, and a binder resin to form an anode layer against a sheet of Cu foil (as an anode current collector).

For instance, the working electrodes were prepared by mixing 75 wt. % active material (Cd or Zn nanowires), 17 wt. % acetylene black (Super-P, as a conductive additive), and 8 wt. % polyvinylidene fluoride (PVDF) as a binder dissolved in N-methyl-2-pyrrolidinoe (NMP). After coating the slurries on Cu foil, the electrodes were dried at 120° C. in vacuum for 2 h to remove the solvent before a compression treatment. When graphene sheets or expanded graphite flakes were included, the amount of acetylene black was reduced accordingly.

Then, the electrodes were cut into a disk ($\phi$=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M LiPF$_6$ electrolyte solution dissolved in a mixture of ethylene carbonate (EC) and diethyl carbonate (DEC) (EC-DEC, 1:1 v/v). Various anode material compositions were evaluated. The cell assembly was performed in an argon-filled glovebox. The CV measurements were carried out using a CH-6 electrochemical workstation at a scanning rate of 1 mV/s. The electrochemical performance of Si nanowires was also evaluated by galvanostatic charge/discharge cycling at a current density of 50-1,000 mA/g, using a LAND electrochemical workstation. Full-cell pouch configurations using lithium iron phosphate and lithium cobalt oxide cathodes were also prepared and tested.

It may be noted that the lithium-ion battery industry has adopted a nomenclature system for a charge or discharge rate. For instance, 1 C charging means completing charging procedure in 1 hour and 2 C charging means completing charging procedure in ½ hours (30 minute). A 10 C charging rate means charging completion in 1/10 hours (6 minutes).

Figure 9:
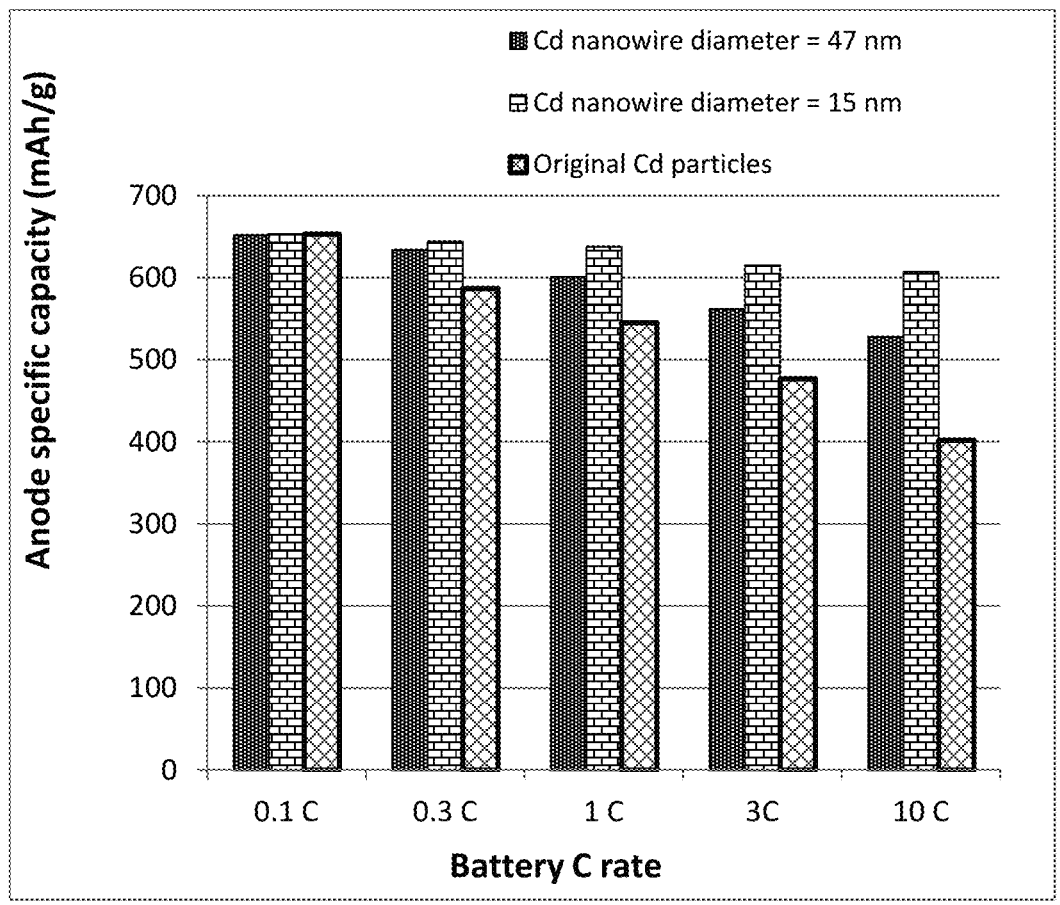

Some experimental results are summarized in FIG. 9, which indicates that the composite anode containing 90% by wt. of Cd nanowires having a diameter of 15 nm is capable of delivering a lithium storage capacity of 653 mAh/g (based on the total electrode composite weight, not just the Cd weight) at 0.1 C rate and 607 mAh/g at 10 C rate. These small-diameter Cd nanowires were obtained with the assistance of graphene sheets. The composite anode containing 90% by wt. of Cd nanowires having a diameter of 47 nm is capable of delivering a lithium storage capacity of 652 mAh/g at 0.1 C rate and 528 mAh/g at 10 C rate. At this ultra-high rate of 10 C, one can complete the charge or discharge in 1/10 hours or 6 minutes. In contrast, the lithium battery cell featuring original Cd particles as the anode active material exhibits a specific capacity of 653 mAh/g at 0.1 C rate, but the specific capacity drops to 402 mAh/g at a 10 C charge rate. The production of metal nanowires for battery applications is a tremendous accomplishment. Imagine you can totally recharge your smart phone in 6 minutes. As of now, it typically takes 2 hours. As a point of reference, natural graphite, the most commonly used anode active material, is capable of storing lithium up to 370 mAh/g at 0.1 C rate, but only 250 mAh/g at 10 C rate.

Similar tends were observed for lithium-ion batteries that contain other types of metal nanowires herein produced as the primary anode active material. These observations have demonstrated that smaller-diameter nanowires are significantly more high-rate capable in a lithium-ion battery. The present invention provides a cost-effective process for producing a wide variety of metal nanowires.

Figure 10:
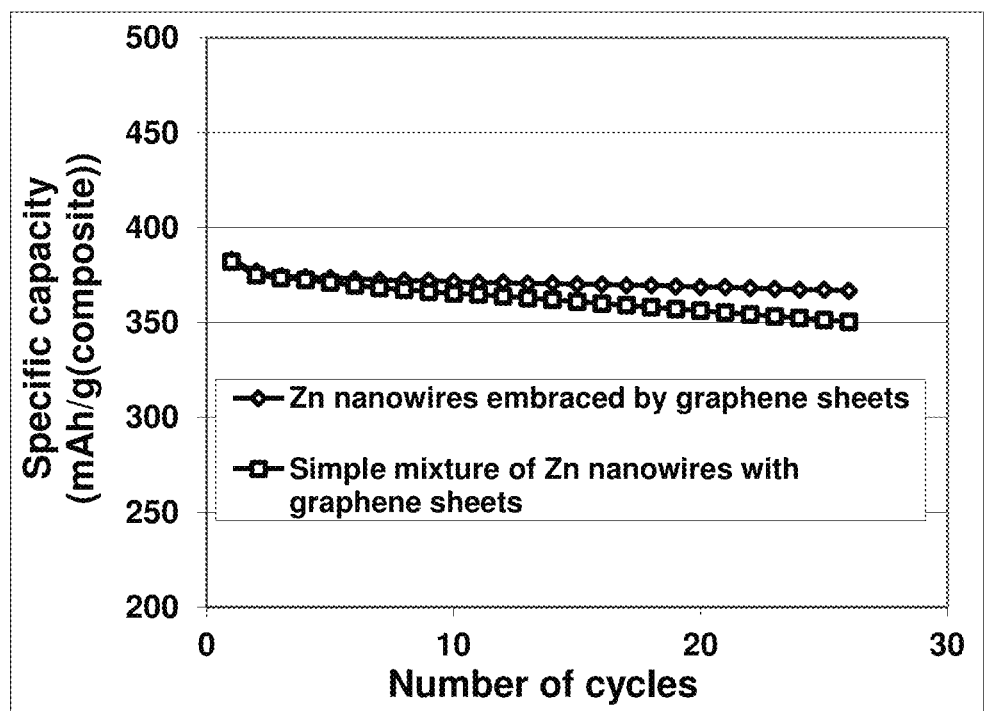
FIG. 10 The charge/discharge cycling behaviors of two lithium-ion cells, one featuring Zn nanowires grown in situ inside graphene sheet-encapsulated particulates as the anode active material and the other containing a simple mixture of Zn nanowires and graphene sheets.

FIG. 10 shows the charge/discharge cycling behaviors of two lithium-ion cells, one featuring Zn nanowires grown in situ inside graphene sheet-encapsulated particulates as the anode active material and the other containing a simple mixture of Zn nanowires and graphene sheets. The latter anode was obtained by preparing Zne nanowires without the presence of graphene sheets but later added with an equal amount of graphene sheets as a conductive additive. The results have demonstrated the superior cycling behavior of a lithium-ion battery having nanowires grown in situ inside graphene-encapsulated particulates. These nanowires are significantly longer and smaller in diameter. Many of these metal nanowires are curly in shape having a radius of curvature that can be varied from 100 nm to 20 μm.

I claim:

1. A process for producing graphene/metal nanowire hybrid material composition, said process comprising:

(A) preparing a catalyst metal-coated mixture mass, which includes (i) mixing exfoliated graphite flakes, having a flake thickness from 100 nm to 1 µm, or graphene sheets, having a thickness from 0.34 nm to 100 nm, with source metal particles, having a particle diameter from 50 nm to 50 µm, to form a mixture and (ii) depositing a catalytic metal, in the form of nanoparticles having a size from 1 nm to 100 nm or a coating having a thickness from 1 nm to 100 nm, onto surfaces of said exfoliated graphite flakes or graphene sheets and/or surfaces of said source metal particles, wherein said source metal material is a transition metal selected from Mn, Ag, Pd, Zn, Cd, Mo, Nb, Zr, an alloy thereof, or a combination thereof, Be, Ca, an alloy thereof, a compound thereof, or a combination thereof; and (B) exposing said catalyst metal-coated mixture mass to a high temperature environment, from 100° C. to 2,500° C., for a period of time sufficient to enable a catalytic metal-assisted growth of multiple metal nanowires, having a diameter or thickness from 2 nm to 100 nm, from said source metal particles to form said graphene-metal nanowire hybrid material composition.

2. The process of claim 1, wherein said catalytic metal is selected from Cu, Ni, Co, Mn, Fe, Ti, Al, Ag, Au, Pt, Pd, Pb, Bi, Sb, Zn, Cd, Ga, In, Zr, Te, P, Sn, Ge, Si, As, Te, Se, or a combination thereof.

3. The process of claim 1, wherein said graphene sheets are selected from a single- layer sheet or few-layer platelet of pristine graphene, graphene oxide, reduced graphene oxide, graphene fluoride, graphene bromide, graphene iodide, boron-doped graphene, nitrogen-doped graphene, chemically functionalized graphene, or a combination thereof, wherein few layer is defined as less than 10 layers of graphene planes.

4. The process of claim 1, wherein said graphene sheets or exfoliated graphite flakes and said metal particles are mixed to form a mixture in a particulate form of multiple secondary particles having a size from 1 µm to 30 µm.

5. The process of claim 4, wherein at least one of said secondary particles comprises multiple metal nanowires that are embraced or encapsulated by a shell of graphene sheets or exfoliated graphite flakes.

6. The process of claim 1, wherein said step (A) comprises mixing said graphene sheets or exfoliated graphite flakes and said source metal particles to form a mixture in such a manner that one or a plurality of said source metal particles are wrapped around by graphene sheets or exfoliated graphite flakes.

7. The process of claim 1, wherein said graphene sheets or exfoliated graphite flakes and said source metal particles are mixed to form a mixture and an optional conductive additive is added to this mixture to increase the conductivity of the mixture, wherein the conductive additive is selected from natural graphite, artificial graphite, mesophase carbon, mesophase pitch, mesocarbon microbead, soft carbon, hard carbon, coke, carbon fiber, carbon nanofiber, carbon nanotube, carbon black, or a combination thereof.

8. The process of claim 1, wherein said step of depositing a catalytic metal includes (a) dissolving or dispersing a catalytic metal precursor in a liquid to form a precursor solution, (b) bringing said precursor solution in contact with surfaces of said graphene sheets or exfoliated graphite flakes and/or surfaces of said source metal particles, (c) removing said liquid; and (d) chemically or thermally converting said catalytic metal precursor to said catalytic metal coating or nanoparticles.

9. The process of claim 8, wherein said step (d) of chemically or thermally converting said catalytic metal precursor is conducted concurrently with the procedure (B) of exposing said catalyst metal-coated mixture mass to a high temperature environment.

10. The process of claim 8, wherein said catalytic metal precursor is a salt or organo-metal molecule of a metal selected from Cu, Ni, Co, Mn, Fe, Ti, Al, Ag, Au, Pt, Pd, Pb, Bi, Sb, Zn, Cd, Ga, In, Zr, Te, P, Sn, Ge, Si, As, Te, Se, or a combination thereof.

11. The process of claim 8, wherein said catalytic metal precursor is selected from a nitrate, acetate, sulfate, phosphate, hydroxide, or carboxylate of a metal selected from Cu, Ni, Co, Mn, Fe, Ti, Al, Ag, Au, Pt, Pd, Pb, Bi, Sb, Zn, Cd, Ga, In, Zr, Te, P, Sn, Ge, Si, As, Te, Se, or a combination thereof.

12. The process of claim 8, wherein said catalytic metal precursor is selected from a nitrate, acetate, sulfate, phosphate, hydroxide, or carboxylate of a transition metal.

13. The process of claim 8, wherein said catalytic metal precursor is selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper hydroxide, nickel hydroxide, cobalt hydroxide, manganese hydroxide, iron hydroxide, titanium hydroxide, aluminum hydroxide, copper carboxylate, nickel carboxylate, cobalt carboxylate, manganese carboxylate, iron carboxylate, titanium carboxylate, aluminum carboxylate, or a combination thereof.

14. The process of claim 1, wherein said step of depositing a catalytic metal is conducted by a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, ball milling, or a combination thereof.

15. The process of claim 1, wherein said procedure of exposing said catalyst metal-coated metal material to a high temperature environment is conducted in a protective atmosphere of an inert gas, nitrogen gas, hydrogen gas, a mixture thereof, or in a vacuum.

16. The process of claim 1, wherein said source metal material and said catalytic metal form an eutectic point and said procedure of exposing said catalyst metal-coated source metal material to a high temperature environment includes exposing said material to a temperature equal to or higher than said eutectic point for a desired period of time and then bringing said material to a temperature below said eutectic point.

17. The process of claim 16, wherein said exposure temperature is higher than said eutectic temperature by 0.5 to 500 degrees in Celsius scale.

18. The process of claim 1, wherein said step of mixing the source metal particles and graphene sheets is conducted by liquid solution mixing, homogenizer mixing, high shearing mixing, wet milling, air milling, or ball-milling.

19. The process of claim 1, wherein said mixing of said graphene sheets with source metal particles is conducted after surfaces of said graphene sheets and/or said source metal particles are deposited with said catalytic metal.

20. The process of claim 1, wherein said mixing of graphene sheets with source metal particles is conducted in such a manner that the resulting mixture is in a form of porous secondary particles having a diameter from 1 μm to 20 μm and having sub-micron pores therein from 2 nm to 1 μm in size.

21. The process of claim 1, further comprising a procedure of separating said graphene sheets from said metal nanowires.

22. The process of claim 1, further comprising a procedure of removing said catalytic metal from said graphene-metal nanowire hybrid material composition.

23. The process of claim 1, further comprising a procedure of mixing said graphene/metal nanowire hybrid composition with a carbonaceous or graphitic material as a conductive additive and an optional binder material to form an electrode layer, wherein said carbonaceous or graphitic material is selected from a chemical vapor deposition carbon, physical vapor deposition carbon, amorphous carbon, chemical vapor infiltration carbon, polymeric carbon or carbonized resin, pitch-derived carbon, natural graphite, artificial graphite, mesophase carbon, mesophase pitch, mesocarbon microbead, soft carbon, hard carbon, coke, carbon fiber, carbon nanofiber, carbon nanotube, carbon black, or a combination thereof.

24. A graphene-metal nanowire hybrid material composition produced by the process of claim 1.

25. A battery electrode containing a graphene-metal nanowire hybrid material composition produced by the process of claim 1.

26. A lithium battery containing graphene-metal nanowire hybrid material composition produced by the process of claim 1 as an anode active material.

* * * * *